US012810578B2

(12) United States Patent
Park et al.

(10) Patent No.: US 12,810,578 B2
(45) Date of Patent: Nov. 24, 2026

(54) METHOD FOR MULTIMODAL EMBEDDING AND SYSTEM THEREFOR

(71) Applicants: SAMSUNG SDS CO., LTD., Seoul (KR); SEOUL NATIONAL UNIVERSITY R&DB FOUNDATION, Seoul (KR)

(72) Inventors: Jae Yoo Park, Seoul (KR); Jeong Hyung Park, Seoul (KR); Bo Hyung Han, Seoul (KR)

(73) Assignees: SAMSUNG SDS CO., LTD., Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 296 days.

(21) Appl. No.: 18/535,439

(22) Filed: Dec. 11, 2023

(65) Prior Publication Data

US 2024/0290065 A1 Aug. 29, 2024

(30) Foreign Application Priority Data

Feb. 27, 2023 (KR) ........................ 10-2023-0025792

(51) Int. Cl.
*G06V 10/44* (2022.01)
*G06V 10/74* (2022.01)

(52) U.S. Cl.
CPC ............ *G06V 10/44* (2022.01); *G06V 10/761* (2022.01)

(58) Field of Classification Search
None
See application file for complete search history.

(56) References Cited

U.S. PATENT DOCUMENTS

2020/0250538 A1* 8/2020 Li ........................ G06N 3/0464
2022/0036127 A1* 2/2022 Lin ........................ G06T 11/60
2022/0130499 A1* 4/2022 Zhou ........................ G06F 40/30
2022/0391755 A1* 12/2022 Li ........................ G06V 30/153
(Continued)

FOREIGN PATENT DOCUMENTS

CN 113807307 A 12/2021
CN 114549874 A 5/2022
(Continued)

OTHER PUBLICATIONS

Wang et al., “Learning two-branch neural networks for image-text matching tasks” (Year: 2019).*
(Continued)

*Primary Examiner* — SJ Park
(74) *Attorney, Agent, or Firm* — Sughrue Mion, PLLC

(57) ABSTRACT

Provided are a method for multimodal embedding and a system therefor. The method according to some embodiments may include generating a plurality of patch features for an image sample through an image encoder, wherein the image sample and text sample form a positive pair, generating a plurality of token features for a text sample through a text encoder, softly masking patch features associated with a specific token of the text sample, generating a joint embedding by inputting the masked patch features and the token features into a multimodal encoder, and updating the multimodal encoder by performing an image-text matching (ITM) task based on the joint embedding.

15 Claims, 18 Drawing Sheets

(56) References Cited

U.S. PATENT DOCUMENTS

2024/0177180 A1* 5/2024 Perera ................ G06Q 30/0202

FOREIGN PATENT DOCUMENTS

| | | | |
|---|---|---|---|
| CN | 114724231 | A | 7/2022 |
| KR | 10-2022-0022726 | A | 2/2022 |

OTHER PUBLICATIONS

Wu et al., "Learning fragment self-attention embeddings for image-text matching" (Year: 2019).*
Li et al., "Align before fuse: vision and language representation learning with momentum distillation" (Year: 2021).*
Li et al., "Align before Fuse: Vision and Language Representation Learning with Momentum Distillation," arXiv:2107.07651v2, Oct. 7, 2021, Total 16 pages.
Yang et al., "Vision-Language Pre-Training with Triple Contrastive Learning," https://arxiv.org/abs/2202.10401, Feb. 21, 2022, Total 10 pages.
He et al., "VLMAE: Vision-Language Masked Autoencoder," arXiv:2208.09374v1, Aug. 19, 2022, Total 12 pages.
Duan et al., "Multi-modal Alignment using Representation Codebook," https://arxiv.org/abs/2203.00048, Feb. 28, 2022, Total 10 pages.
Jang et al., "Unifying Vision-Language Representation Space with Single-tower Transformer," arXiv:2211.11153v1, Nov. 21, 2022, Total 13 pages.

* cited by examiner

--PRIOR ART--

METHOD FOR MULTIMODAL EMBEDDING AND SYSTEM THEREFOR

CROSS-REFERENCE TO RELATED APPLICATION

This application claims priority from Korean Patent Application No. 10-2023-0025792 filed on Feb. 27, 2023 in the Korean Intellectual Property Office, and all the benefits accruing therefrom under 35 U.S.C. 119, the contents of which in its entirety are herein incorporated by reference.

BACKGROUND

1. Field

The present disclosure relates to method for a multimodal embedding and system therefor, and more particularly, to a method and system for embedding multimodal data using a deep learning model.

2. Description of the Related Art

Currently, there is a rapid surge of interest in the field of deep learning concerning multimodal tasks, which involve the concurrent handling of multimodal (or multi-modality) data. Moreover, there is an active pursuit of effective methodologies to embed multimodal data.

A method has recently been proposed for training deep learning models using multimodal paired datasets. Specifically, the proposed method employs datasets comprising pairs of images and text to learn embeddings (i.e., embedding representations) of multimodal data through contrastive learning tasks.

However, the proposed method exhibits a noticeable limitation by not preventing deep learning models from generating embeddings while focusing exclusively on distinctive regions within an input image (e.g., regions containing main objects). Consequently, the resultant embeddings lack faithfulness to contextual information within the input image (e.g., embeddings lack information regarding peripheral objects or backgrounds due to their exclusive focus on the main object regions).

SUMMARY

Aspects of the present disclosure provide a method and system for accurately embedding multimodal data.

Aspects of the present disclosure also provide a method and system for accurately learning embeddings (i.e., embedding representations) of multimodal data when fine-grained annotation information is not provided.

Aspects of the present disclosure also provide a method and system capable of improving the performance of multimodal tasks.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to some embodiments of the present disclosure, there is provided a method for multimodal embedding performed by at least one computing device. The method may include: generating a plurality of patch features for an image sample through an image encoder, wherein the image sample and text sample form a positive pair; generating a plurality of token features for a text sample through a text encoder; softly masking patch features associated with a specific token of the text sample; generating a joint embedding by inputting the masked patch features and the token features into a multimodal encoder; and updating the multimodal encoder by performing an image-text matching (ITM) task based on the joint embedding.

In some embodiments, the specific token may be randomly selected from among tokens of the text sample.

In some embodiments, the multimodal encoder may include at least one attention layer, which analyzes relationships between the token features and the patch features, and the softly masking the patch features associated with the specific token may include: extracting attention values for a feature of the specific token and the patch features from an attention map generated by the at least one attention layer; generating a soft mask for masking the patch features based on the attention values; and applying the soft mask to the patch features.

In some embodiments, the joint embedding is a first joint embedding, and the extracting the attention values may include: generating a second joint embedding by inputting the token features and the patch features into the multimodal encoder; calculating a matching score between the text sample and the image sample by performing the ITM task based on the second joint embedding; reflecting a gradient, which indicates the influence of the at least one attention map on the matching score, in the at least one attention map; and extracting the attention values from the at least one attention map with the gradient reflected therein.

In some embodiments, the extracting the attention values may include: aggregating a plurality of attention maps, generated in a plurality of attention layers; and extracting the attention values from the aggregated attention map.

In some embodiments, the image encoder and the text encoder may be updated through the ITM task.

In some embodiments, the method may further include: updating the image encoder and the text encoder by performing a contrastive learning task based on at least some of the patch features and at least some of the token features.

In some embodiments, the patch features may include a special patch feature corresponding to a special token, the token features may include a special token feature corresponding to the special token, a loss of the contrastive learning task may be calculated based on a similarity between the special patch feature and the special token feature.

In some embodiments, the loss of the contrastive learning task may be calculated based on a feature similarity and a focal weight, and the greater the feature similarity, the smaller the focal weight may be determined to be.

In some embodiments, the token features may include a feature corresponding to a mask token, the joint embedding is a first joint embedding, and the method further may include: generating a second joint embedding, which include a plurality of embeddings corresponding to tokens of the text sample, by inputting the patch features and the token features into the multimodal encoder; and additionally updating the multimodal encoder by performing a masked-language modeling (MLM) task based on an embedding corresponding to the mask token, among the plurality of embeddings.

In some embodiments, the token features may include a feature corresponding to a mask token and be obtained by substituting the specific token with the mask token.

In some embodiments, the updating the multimodal encoder may include: predicting a matching status between the image sample and the text sample by inputting at least some of the joint embedding into a prediction layer; and updating the multimodal encoder based on a loss from a result of the predicting.

In some embodiments, the joint embedding may include a plurality of embeddings, and among the plurality of embeddings, an embedding corresponding to a special token may be input into the prediction layer.

In some embodiments, the joint embedding includes a first embedding, and the method may further include: generating a second joint embedding by inputting the patch features and the token features into the multimodal encoder; and additionally updating the multimodal encoder by performing the ITM task based on the second joint embedding.

According to another embodiments of the present disclosure, there is provided a system for multimodal embedding. The system may include: at least one processor; and a memory configured to store at least one instruction, wherein the at least one processor, by executing the at least one instruction, performs operations including: generating a plurality of patch features for an image sample through an image encoder, wherein the image sample and text sample form a positive pair; generating a plurality of token features for a text sample through a text encoder; softly masking patch features associated with a specific token of the text sample; generating a joint embedding by inputting the masked patch features and the token features into a multimodal encoder; and updating the multimodal encoder by performing an image-text matching (ITM) task based on the joint embedding.

According to yet another embodiments of the present disclosure, there is provided a computer program stored on a computer-readable recording medium for executing, by being coupled to a computing device, the steps. The steps may include: generating a plurality of patch features for an image sample through an image encoder, wherein the image sample and text sample form a positive pair; generating a plurality of token features for a text sample through a text encoder; softly masking patch features associated with a specific token of the text sample; generating a joint embedding by inputting the masked patch features and the token features into a multimodal encoder; and updating the multimodal encoder by performing an image-text matching (ITM) task based on the joint embedding.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
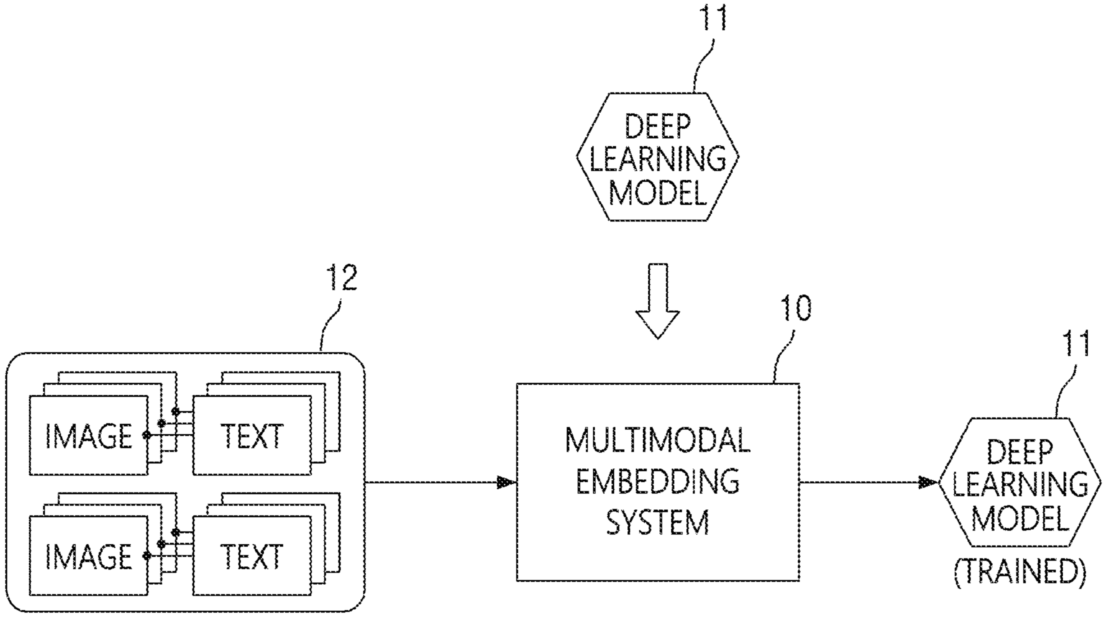
FIGS. 1 and 2 are schematic views illustrating operations of a multimodal embedding system according to some embodiments of the present disclosure.

Hereinafter, example embodiments of the present disclosure will be described with reference to the attached drawings. Advantages and features of the present disclosure and methods of accomplishing the same may be understood more readily by reference to the following detailed description of example embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that may be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), may be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Embodiments of the present disclosure will hereinafter be described with reference to the accompanying drawings.

Figure 2:
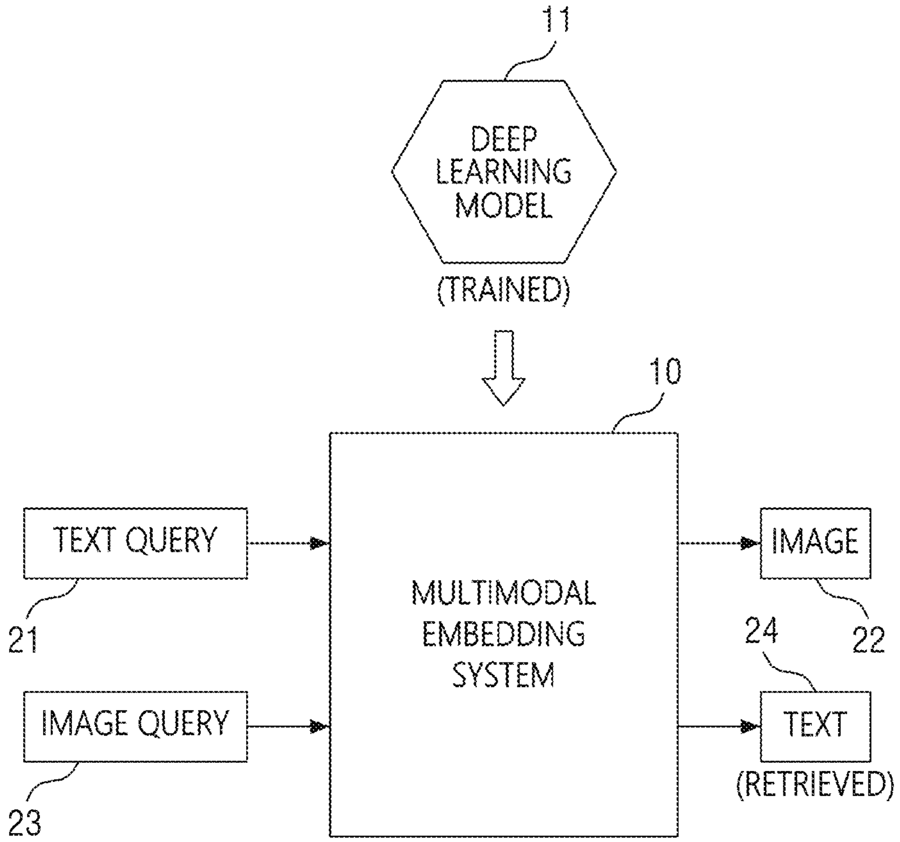

FIGS. 1 and 2 are schematic views illustrating operations of a multimodal embedding system according to some embodiments of the present disclosure. FIGS. 1 and 2 assume a multimodal environment in which both images and text are collectively handled.

As illustrated in FIG. 1, a multimodal embedding system 10 may be a device/system capable of embedding given multimodal data using a deep learning model 11. For example, the multimodal embedding system 10 may train the deep learning model 11 by utilizing paired datasets 12 and may embed multimodal data using the trained deep learning model 11. The deep learning model 11 may also be referred to as an "embedding model" or "multimodal embedding model". For the convenience of explanation, the multimodal embedding system 10 will hereinafter be abbreviated as the "embedding system 10."

The term "multimodal" denotes an environment that collectively handles multimodal (or multi-modality) data. Different modal data may refer to data with diverse types, forms, characteristics (e.g., statistical attributes), and/or domains. For example, text, images, and audio may be treated as different modal data. In another example, first and second data sets with different statistical attributes may also be treated as different modal data.

Specifically, the embedding system 10 may train the deep learning model 11 using datasets 12 comprising pairs of different modal samples (or data samples). For example, as illustrated in FIG. 1, the embedding system 10 may train the deep learning model 11 using data sets 12 containing pairs of text samples and image samples. The structure and training methodology of the deep learning model 11 will be described later with reference to FIG. 3 and the subsequent figures.

The term "sample" or "data sample" refers to an individual unit of data that may be input to the deep learning model 11. In the context of the present disclosure, samples or a data samples may also be referred to as "examples," "instances," "observations," or "individual data."

Meanwhile, the embedding system 10 may perform multimodal tasks (i.e., objective tasks) using the trained deep learning model 11. For example, as illustrated in FIG. 2, the embedding system 10 may perform multimodal tasks such as text-to-image retrieval (see a text query 21 and a retrieved image 22) and/or image-to-text retrieval (see an image query 23 and retrieved text 24) using the trained deep learning model 11, but the present disclosure is not limited thereto. The embedding system 10 may also perform various other multimodal tasks (e.g., image captioning, visual question answering, etc.).

Alternatively, the embedding system 10 may provide the trained deep learning model 11 to a separate device (not illustrated) for performing multimodal tasks or may receive data such as text or images from the separate device, generate embeddings for the received data (e.g., text embeddings, image embeddings, joint embeddings), and provide the generated embedded to the separate device.

The term "data embedding" refers to the representation of data within its designated embedding space. Therefore, embeddings may also be referred to as embedding representations. Moreover, since embeddings are typically in vector format, embedded may also be referred to as embedding vectors. In the context of the present disclosure, embedding vectors may also be referred to as "embedding codes," "latent representations," "latent vectors," or "latent codes."

The embedding system 10 may be implemented using at least one computing device. For example, all functionalities of the embedding system 10 may be implemented within a single computing device. Alternatively, first and second functionalities of the embedding system 10 may be implemented in first and second computing devices, respectively. Yet alternatively, a particular functionality of the embedding system 10 may be implemented across multiple computing devices.

The term "computing device" may encompass any device equipped with computing capabilities, and an exemplary computing device will be described later with reference to FIG. 18.

General descriptions of the operations of the embedding system 10 have been presented, referring to FIGS. 1 and 2. Various methods that may be performed within the embedding system 10 will hereinafter be described with reference to FIG. 3 and the subsequent figures. For clarity within the present disclosure, reference numerals for the deep learning model 11 and its components may be omitted when not directly referring to the accompanying figures.

For the convenience of understanding, it is assumed that all steps/operations of the methods are conducted within the embedding system 10. Therefore, if the subject of a particular step/operation is not explicitly mentioned, it may be inferred that the particular step/operation is performed within the embedding system 10. Nevertheless, in real-world scenarios, some steps/operations of the methods that will hereinafter be described may also be executed in other computing devices.

Figure 3:
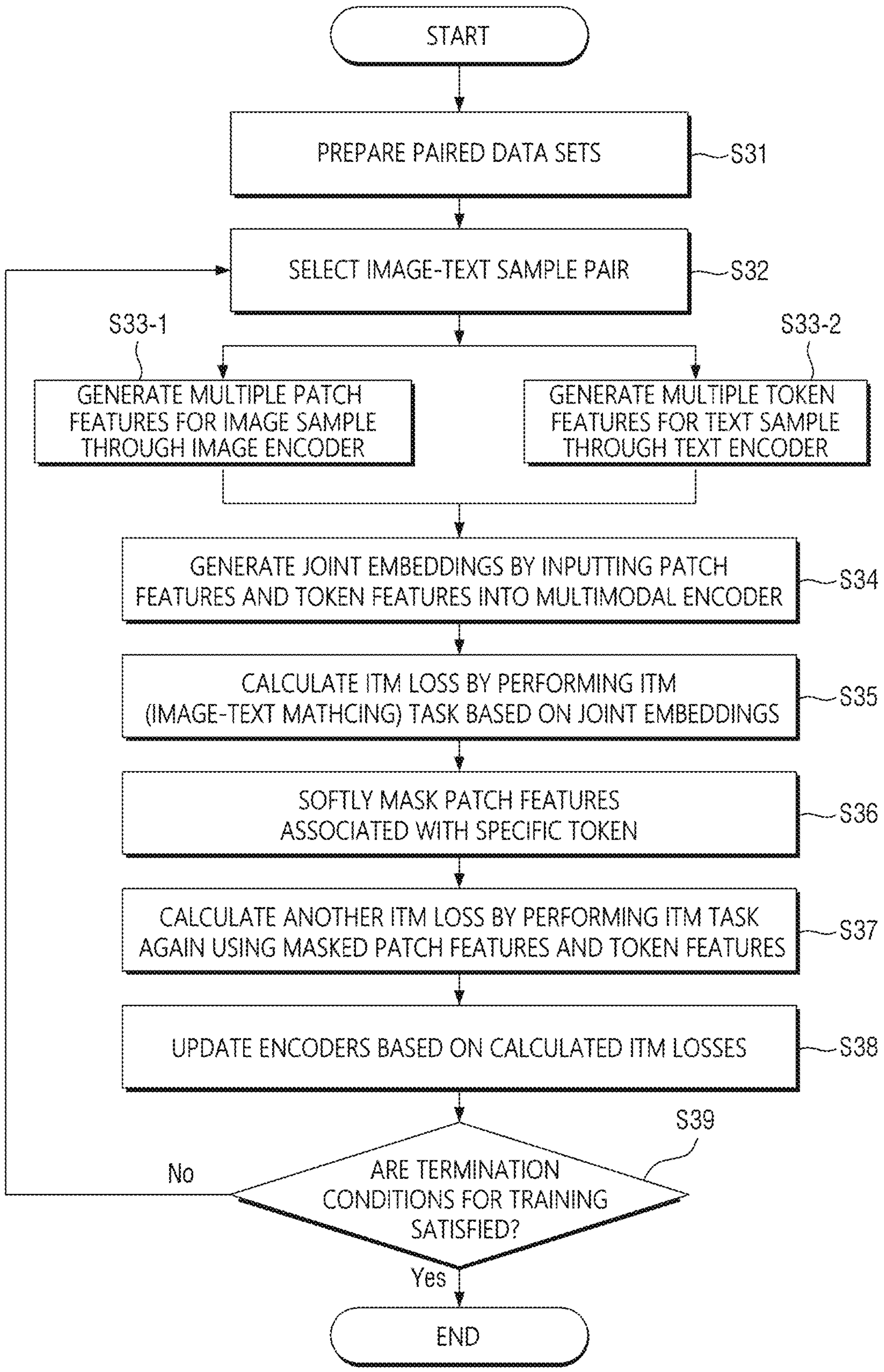
FIG. 3 is a flowchart illustrating a multimodal embedding method according to some embodiments of the present disclosure.

FIG. 3 is a flowchart illustrating a multimodal embedding method according to some embodiments of the present disclosure. However, the multimodal embedding method according to some embodiments of the present disclosure is merely exemplary, and some steps may be added or removed as needed.

Referring to FIG. 3, the multimodal embedding method according to some embodiments of the present disclosure may begin with S31, which involves preparing paired data sets. The paired data sets may consist of text samples and image samples paired together. A method to prepare the paired data sets is not particularly limited.

The paired datasets may include positive pairs and/or negative pairs. The positive pairs may refer to pairs where text samples and image samples are matched, while the negative pairs may refer to pairs where text samples and image samples are not matched. In some cases, the negative pairs may be generated during a training process. For example, the embedding system 10 may (randomly) select text samples and image samples that are not paired from among the paired datasets and use the selected text samples and image samples as the negative pairs.

In S32, an image-text sample pair may be selected from among the paired datasets. The selected image-text sample pair may correspond to either a positive or negative pair. If training is conducted in units of batches, a collection of image-text sample pairs equivalent to the batch size may be selected to form a batch, and subsequent steps may also be performed in the units of batches.

In S33-1, a plurality of patch features for an image sample may be generated through an image encoder. For example, the embedding system 10 may partition the image sample into a plurality of patches (i.e., patch sequences) and generate a plurality of patch features by encoding the patches through the image encoder.

Patch features may also be referred to as "visual features" or "image features." Additionally, since patch features may operate as embeddings of a patch (or an image sample), patch features may also be referred to as "patch embeddings" or "image embeddings." Moreover, the term "patch" may be used interchangeably with "token." In other words, an image token may represent an image patch.

The image encoder may also be referred to as an "image/visual embedding model," "image/visual embedder," or "image/visual encoding module."

The image encoder may be understood as being a component of the deep learning model 11 of FIG. 1 and may have undergone pretraining. For a clearer understanding, the image encoder and S33-1 will hereinafter be described in further detail with reference to FIGS. 4 and 5.

Figure 4:
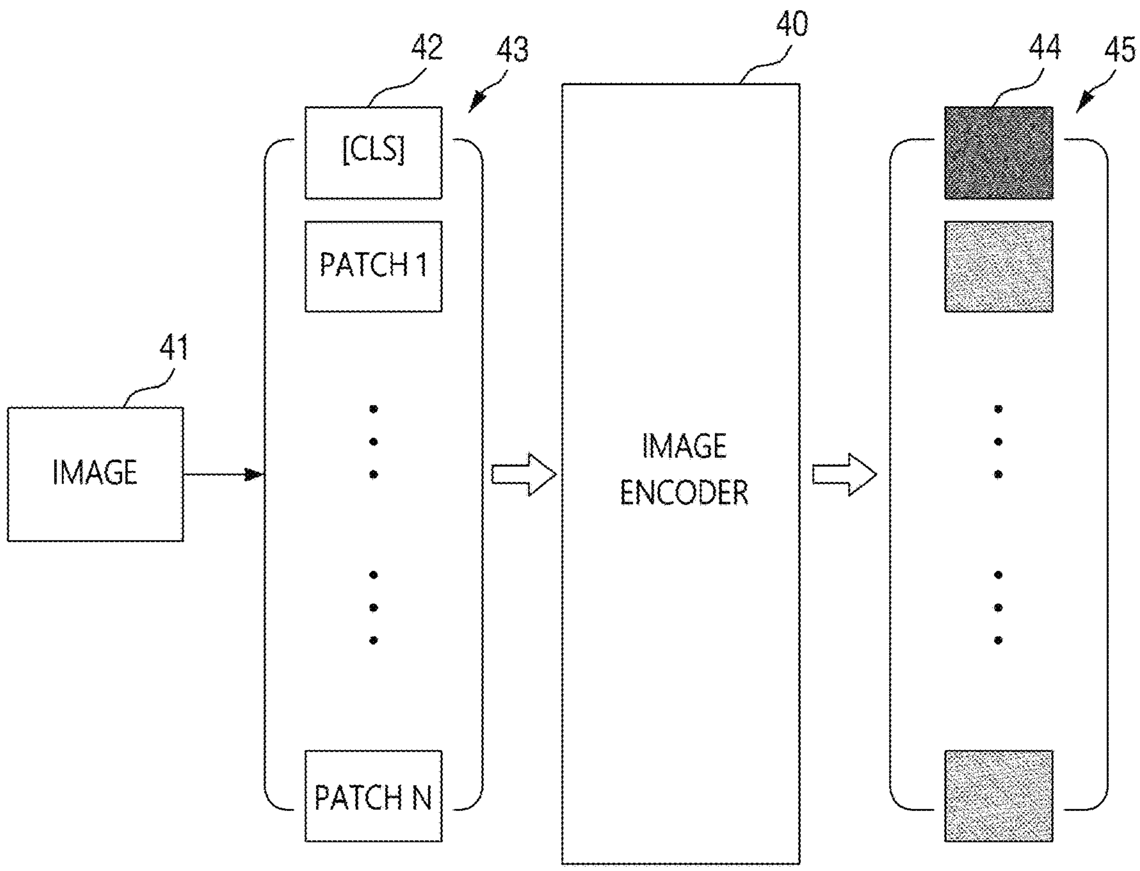
FIG. 4 is a schematic view illustrating the generation of patch features by an image encoder according to some embodiments of the present disclosure.

Referring to FIG. 4, an image encoder 40 may refer to a module that encodes patches 43 of an image sample 41 to generate (or output) patch features 45 (or features for the respective patches). The image encoder 40 may be implemented based on self-attention, a transformers (e.g., vision transformers), or convolutional neural networks (e.g., VGG-16), but the present disclosure is not limited thereto.

The image encoder 40 may further receive a predefined special token, i.e., a classification (CLS) token 42, and output a corresponding patch feature 44, which may also be referred to as a "special patch feature," but the present disclosure is not limited thereto. The technical significance of the CLS token 42 and the implication of general information on the image sample 41 by the feature 44 are already well known in the art to which the present disclosure pertains, and thus, detailed descriptions thereof will be omitted. It is assumed that the image encoder 40 further receives the CLS token 42. In FIG. 4 and the subsequent figures, the feature 44 or its equivalents) are represented with a darker shade.

Figure 5:
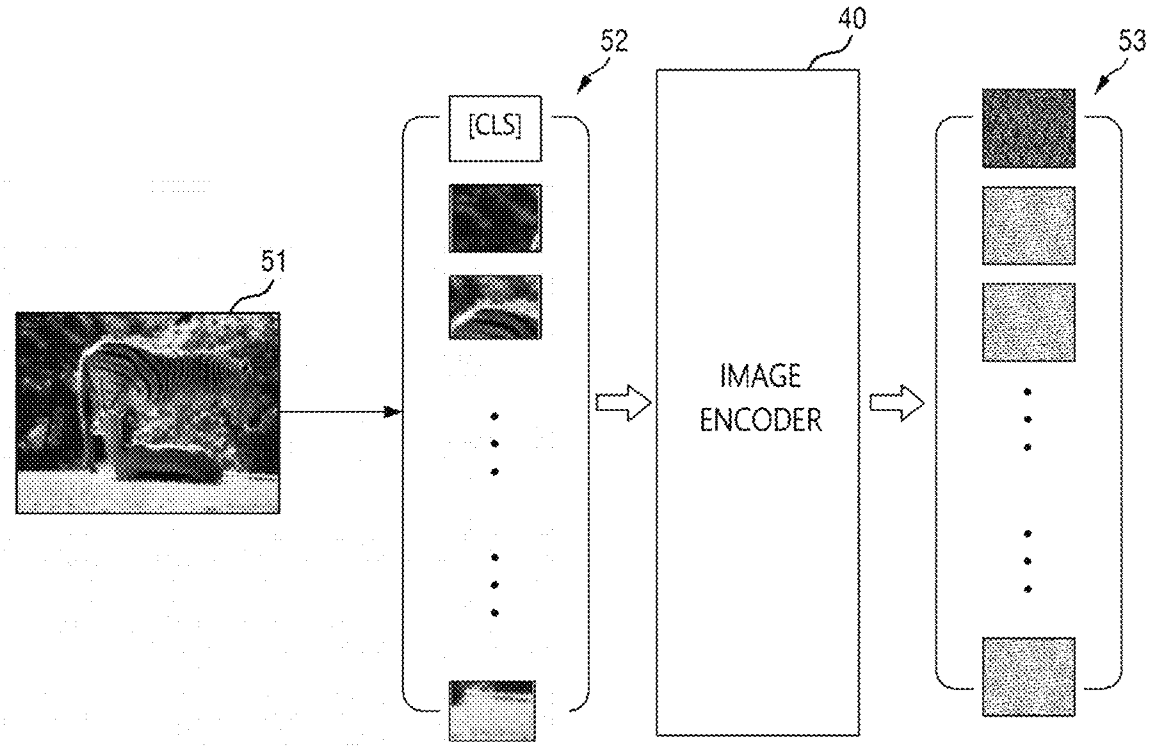
FIG. 5 is a schematic view illustrating an actual example of the generation of patch features by the image encoder according to some embodiments of the present disclosure.

FIG. 5 illustrates an actual example of the generation of patch features 53 of an image sample 51 by the image encoder 40. As mentioned earlier, the patch features 53 may be generated by encoding patches 52 of the image sample 51 through the image encoder 40.

Referring back to FIG. 3, in S33-2, token features for a text sample may be generated through a text encoder. For example, the embedding system 10 may partition (or tokenize) the text sample into a plurality of tokens (or token sequences) and generate a plurality of token features by encoding the tokens through the text encoder.

Token features may also be referred to as "text features." Additionally, since token features may operate as embeddings of a token (or a text sample), token features may also be referred to as "token embeddings" or "text embeddings."

The text encoder may also be referred to as a "text embedding model," "text embedder," "text embedding module," or "language model."

The text encoder may be understood as being a component of the deep learning model 11 of FIG. 1 and may have undergone pretraining. For a clearer understanding, the text encoder and S33-2 will hereinafter be described in further detail with reference to FIGS. 6 through 8.

Figure 6:
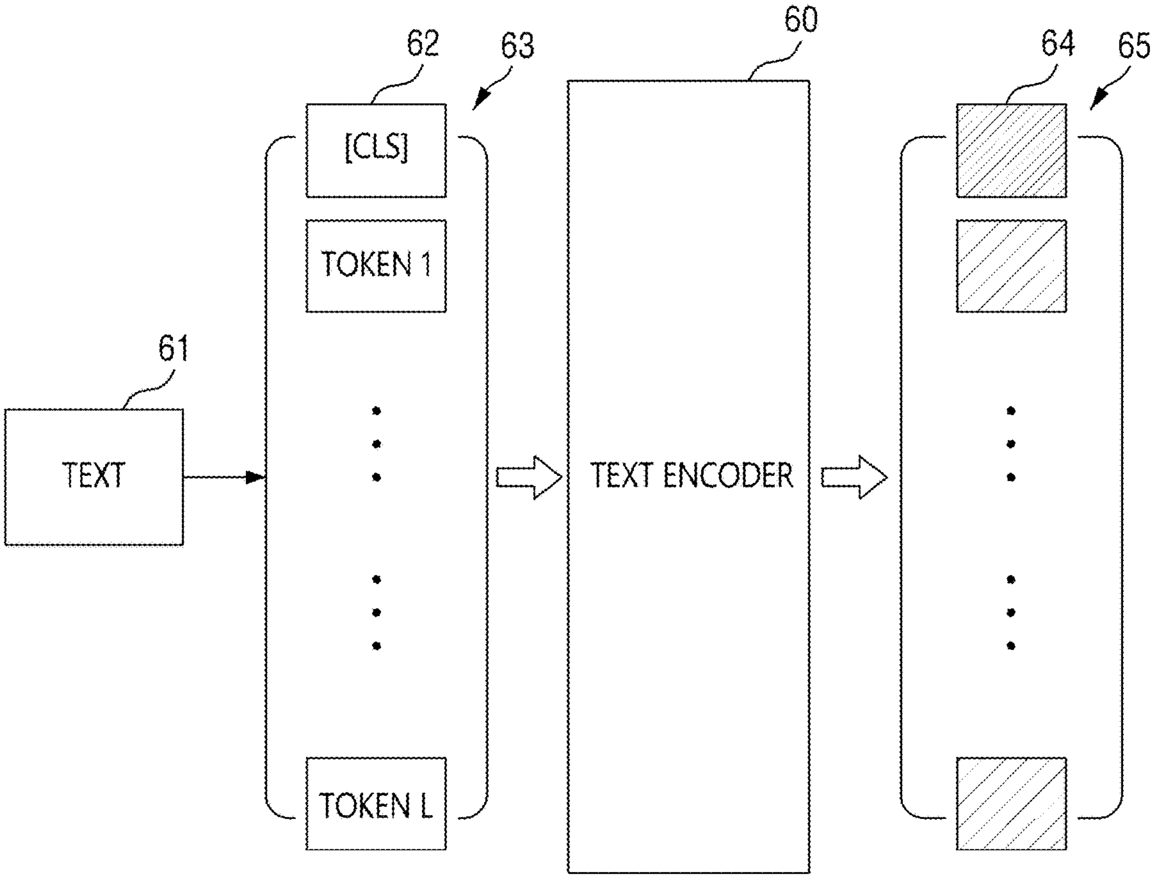
FIG. 6 is a schematic view illustrating the generation of token features by a text encoder according to some embodiments of the present disclosure.

Referring to FIG. 6, a text encoder 60 may refer to a module that encodes patches 63 of a text sample 61 to generate (or output) patch features 65 (or features for the respective patches). The text encoder 60 may be implemented based on self-attention or transformers (e.g., BERT), but the present disclosure is not limited thereto.

The text encoder 60 may further receive a predefined special token, i.e., a CLS token 62, and output a corresponding token feature 64, which may also be referred to as a "special token feature," but the present disclosure is not limited thereto. The technical significance of the CLS token 62 and the implication of general information on the image sample 61 by the feature 64 are already well known in the art to which the present disclosure pertains, and thus, detailed descriptions thereof will be omitted. It is assumed that the text encoder 60 further receives the CLS token 62.

Figure 7:
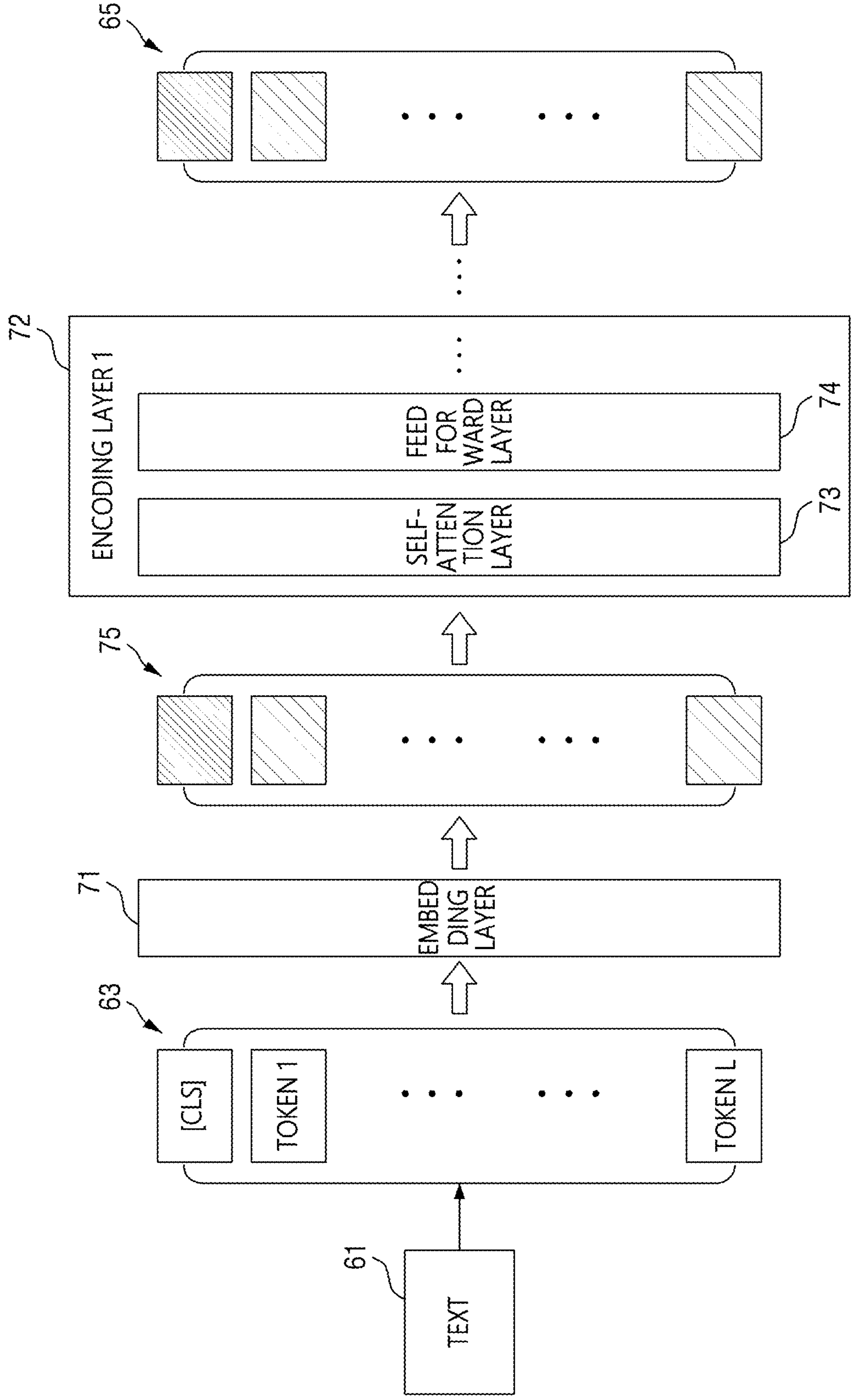
FIG. 7 is a schematic view illustrating the structure and operation of the text encoder according to some embodiments of the present disclosure.

The structure of the text encoder 60 is as illustrated in FIG. 7. Referring to FIG. 7, the text encoder 60 may be configured to include an embedding layer 71 and a plurality of encoding layers 72.

The embedding layer 71 may refer to a layer that receives each of multiple tokens 63 (e.g., receives the one-hot vectors of the respective tokens 63) and outputs token-level embeddings 75. The embedding layer 71 may be implemented as a neural network layer such as a fully-connected layer or a multi-layer perceptron (MLP), but the present disclosure is not limited thereto.

Each of the encoding layers 72 may be configured to include at least one self-attention layer 73 and at least one feedforward layer 74. The self-attention layer 73 may analyze the relationships between input embeddings 75, and the feedforward layer 74 may aggregate information on the input embeddings 75 based on the results of the analysis. The self-attention layer 73 and the feedforward layer 74 are already well known in the art to which the present disclosure pertains, and thus, detailed descriptions thereof will be omitted.

Figure 8:
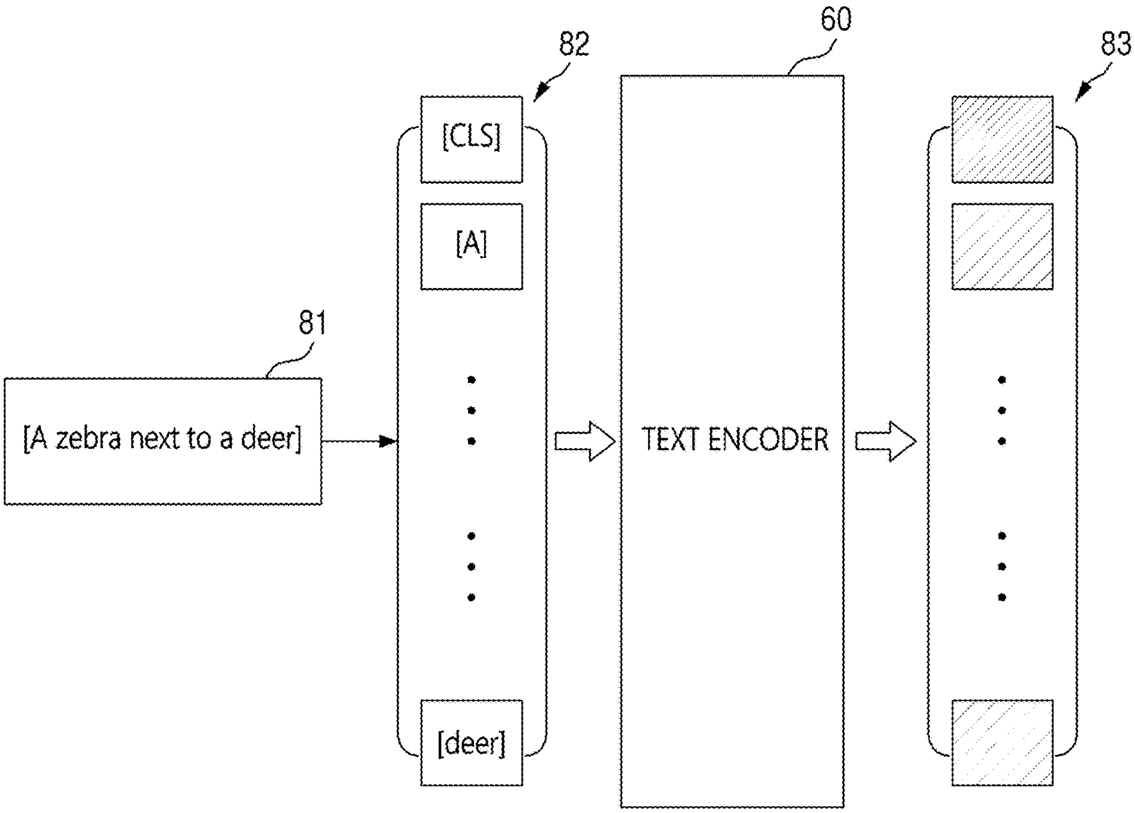
FIG. 8 is a schematic view illustrating an actual example of the generation of token features by the text encoder according to some embodiments of the present disclosure.

FIG. 8 illustrates an actual example of the generation of token features 83 for a text sample 81 (from the positive pair with the image sample 51 of FIG. 5) through the text encoder 60. As mentioned earlier, the token features 83 may be generated by encoding the tokens 82 of the text sample 81 through the text encoder 60.

Referring back to FIG. 3, in S34, token features and patch features may be input (fed) into a multimodal encoder to generate joint embeddings. Here, the multimodal encoder refers to a module that encodes text-related features (i.e., token features) and image-related features (i.e., patch features) together to generate joint embeddings. The term "joint embeddings" may refer to embeddings in a joint (or shared) space and may include multiple embeddings (features) corresponding to the tokens of a text sample.

The multimodal encoder may be implemented based on attention mechanisms (e.g., cross-attention) or transformers, but the present disclosure is not limited thereto. The structure of the multimodal encoder will be described later in detail.

The multimodal encoder may also be referred to as a "multimodal/joint embedding model," "multimodal/joint embedder," or "multimodal/joint embedding module."

In S35, a first image-text matching (ITM) loss may be calculated by performing an ITM task based on the joint embeddings. For a clearer understanding, S35 will hereinafter be described with reference to FIG. 9.

Figure 9:
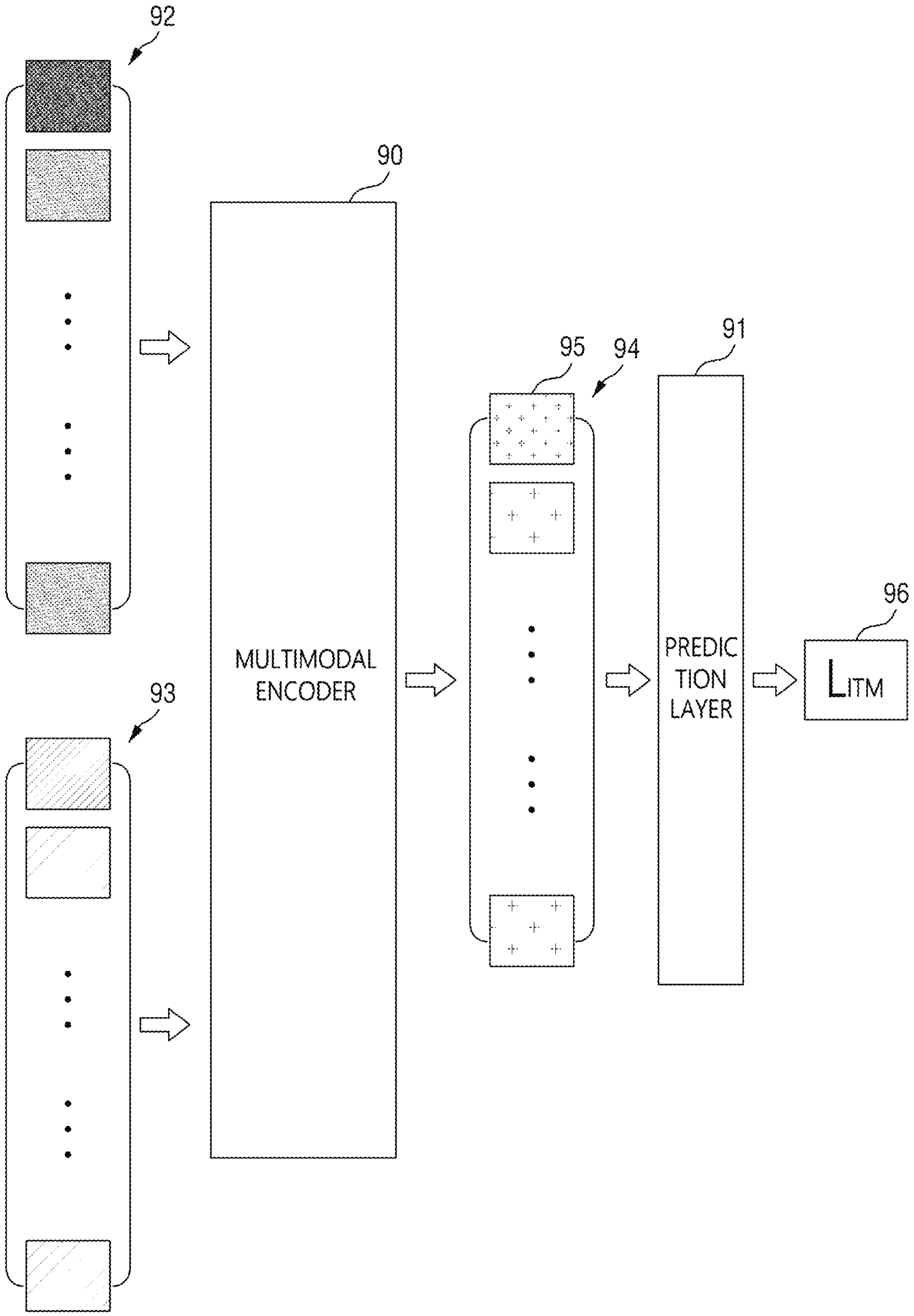
FIG. 9 is a schematic view illustrating an image-to-text matching task according to some embodiments of the present disclosure.

Referring to FIG. 9, it is assumed that the embedding system 10 generates joint embeddings 94 by encoding patch features 92 of an image sample and token features 93 of a text sample together through a multimodal encoder 90. The embedding system 10 may perform an ITM task to predict whether the image sample and the text sample match based on the joint embeddings 94.

For example, the embedding system 10 may input an embedding/feature 95 corresponding to a CLS token, among the joint embeddings 94, into a prediction layer 91 to generate a matching score for the two samples (i.e., to predict the matching status of the two samples). The prediction layer 91 may be implemented as a binary classification layer (e.g., a fully-connected layer) performing binary classification for matching status (i.e., a matching or non-matching class), and a confidence score for the matching class or a processed value thereof may serve as the matching score. However, the present disclosure is not limited to this. Moreover, the embedding system 10 may calculate a first ITM loss 96 ("$L_{ITM}$") based on the difference between the class-specific confidence score (or matching score) and the ground truth (e.g., the ground truth for a positive pair may be "matching"). The first ITM loss 96 may be calculated using a classification loss function such as cross-entropy loss, but the present disclosure is not limited thereto.

Alternatively, the embedding system 10 may perform an ITM task by inputting (or feeding) multiple embeddings included in the joint embeddings 94 or a representative embedding (e.g., an average embedding) of the multiple embeddings to the prediction layer 91. For example, if no CLS token is used, the embedding system 10 may calculate the first ITM loss 96 by calculating the representative embedding and inputting (or feeding) the calculated representative embedding to the prediction layer 91.

Referring back to FIG. 3, in S36, the feature associated with a specific token in (within) the patch features may be softly masked. For example, to introduce stochasticity into a training process, the embedding system 10 may randomly select the specific token from among the tokens of a text sample (including a CLS token). In another example, the embedding system 10 may select the specific token in accordance with a predefined condition (e.g., select a token that has been substituted with a mask token). S36 will be described later in further detail.

In S37, a second ITM loss may be calculated by performing an ITM task again using the masked patch features and token features. For example, the embedding system 10 may generate joint embeddings using a multimodal encoder in a similar manner to that described above in connection with S34 and S35 and perform an ITM task again based on the generated joint embeddings. For a clearer understanding, S37 will hereinafter be described in further detail with reference to FIG. 10.

Figure 10:
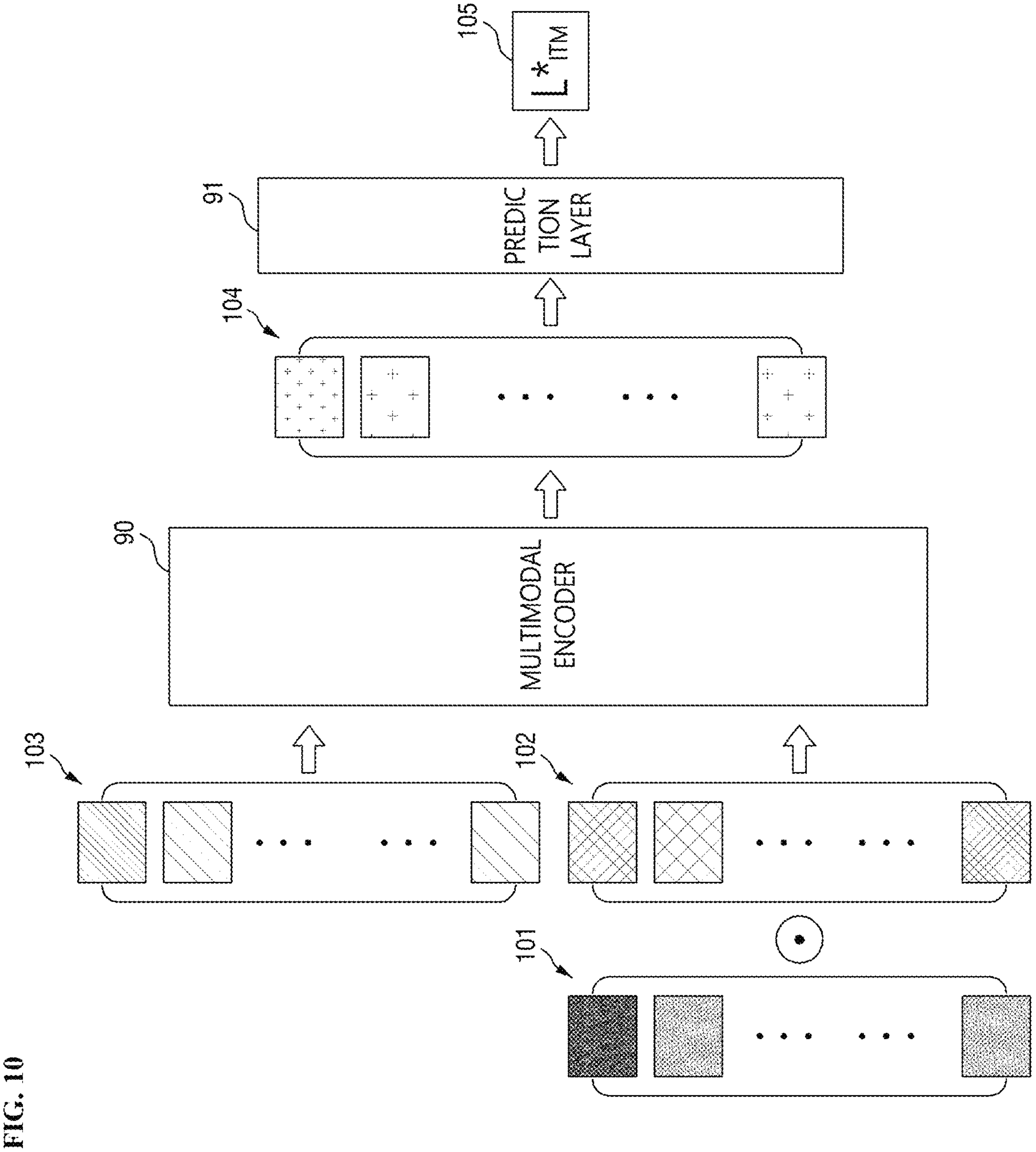
FIG. 10 is a schematic view illustrating an image-text matching (ITM) task using softly-masked patch features according to some embodiments of the present disclosure.

Referring to FIG. 10, assuming the embedding system 10 generates joint embeddings 104 by applying a soft mask 102 to patch features 101 and encoding the patch features 102 together with the token features 103, the embedding system 10 may perform an ITM task again based on the joint embeddings 104. As mentioned earlier, the embedding system 10 may calculate a second ITM loss 105 ("$L^*_{ITM}$") by inputting (or feeding) at least some of the joint embeddings 104 into the prediction layer 91.

S36 and S37 may be performed only for positive pairs. For negative image-text sample pairs, there are minimal or no image sample features associated with specific text sample tokens, and conducting an ITM task again offers almost no practical benefit.

A soft masking technique and S36 will hereinafter be described with reference to FIGS. 11 through 14.

Figure 11:
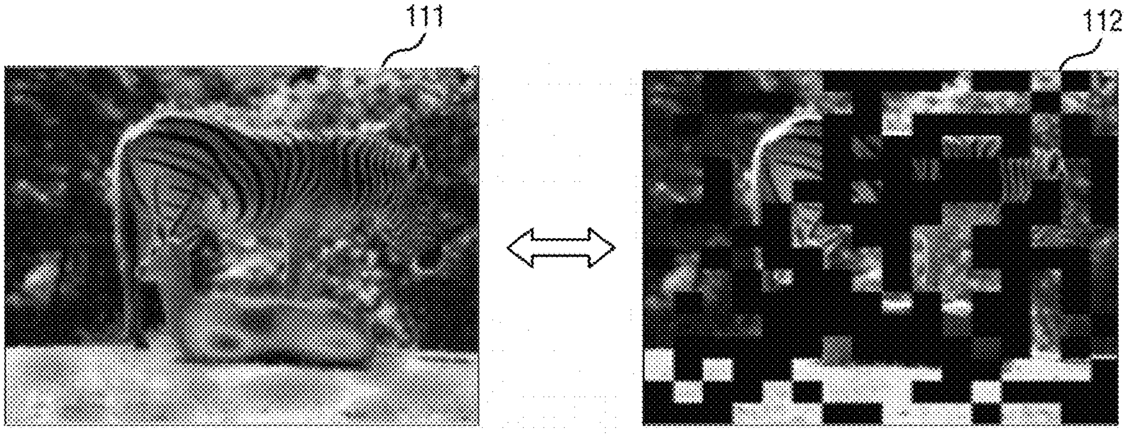
FIG. 11 is a schematic view illustrating the concept of soft masking and the rationale for employing soft masking in embodiments of the present disclosure.

The concept of soft masking and the rationale for employing soft masking in some embodiments of the present disclosure will be briefly described first with reference to FIG. 11.

FIG. 11 shows an image sample 111 with an activated feature region associated with a specific token of "deer," on the left, and an image sample 112 with a hard mask applied thereto, on the right.

Referring to FIG. 11, a hard mask (e.g., a mask composed of values of ones or zeros) completely removes features (or information) of a specific region (or patch) of the image sample 112. On the other hand, a soft mask simply suppresses or weakens features (or information) of a specific region (or patch) of the image sample 111 because it masks each feature region based on the level of activation.

Meanwhile, a method to enhance the performance of a multimodal embedding model by preventing each deep learning model from focusing solely on discriminative regions of an image through patch-level hard masking and increasing the difficulty of an ITM task may be explored. However, patch-level masking for masking a region of an image sample associated with a specific token (e.g., a token referring to a particular object) in units of patches requires fine-grained annotation information at an object level, incurring substantial costs in preparing paired datasets tagged with such annotation information. Moreover, even if such annotation information exists, it is not easy in general to mask a specific object region in units of patches. Furthermore, even if patch-level masking of the specific object region is possible, hard masking may degrade the performance of the multimodal embedding model because it causes significant damage to the features (or context) of the image sample by removing not only the features/information of the specific object region, but also the features/information of its surroundings.

For these and other reasons, a soft masking technique may be employed in some embodiments of the present disclosure. The soft masking technique performs masking to the extent that does not damage the features (or context) of the image sample, thereby increasing the difficulty of an ITM task and guiding each deep learning model to comprehensively understand various features (or information) of the image sample.

S36 will hereinafter be described with reference to FIGS. 12 through 14.

Figure 12:
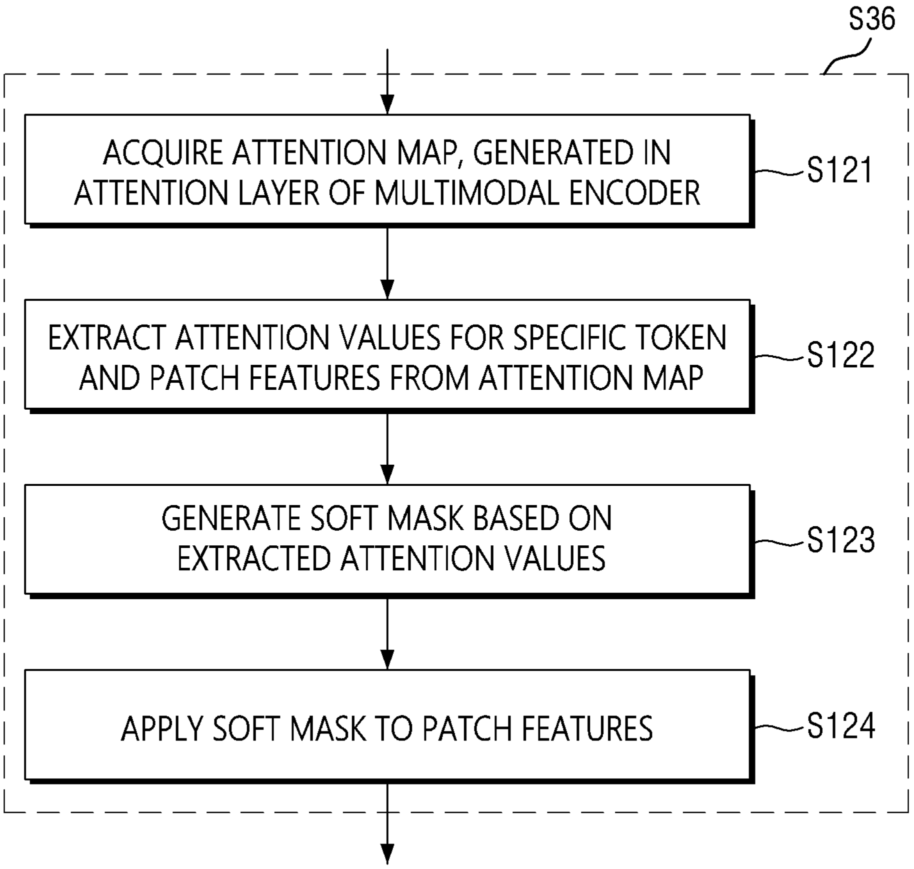
FIG. 12 is a flowchart illustrating S36 of FIG. 3.

FIG. 12 is a flowchart illustrating S36 of FIG. 3.

Referring to FIG. 12, to generate a soft mask, the embedding system 10 may acquire an attention map generated in an attention layer of a multimodal encoder (S121). The multimodal encoder may include at least one attention layer, such as a cross-attention layer, and the attention layer may generate an attention map by analyzing the relationships between patch features (or patches) and token features (or tokens) (e.g., by forming query (Q) vectors based on the token features, forming key (K) vectors based on the patch features, and performing an attention operation between the Q vectors and the K vectors). The attention map may be a result of an attention operation performed between Q vectors and K vectors, a map that additionally incorporates value (V) vectors, or a map derived based on a combination of the previous two maps.

In S122, attention values for a specific token and patch features may be extracted from the attention map. The extracted attention values may be understood as representing the relationships between features of the specific token and the patch features. For a clearer understanding, S122 will hereinafter be described with reference to FIG. 13.

Figure 13:
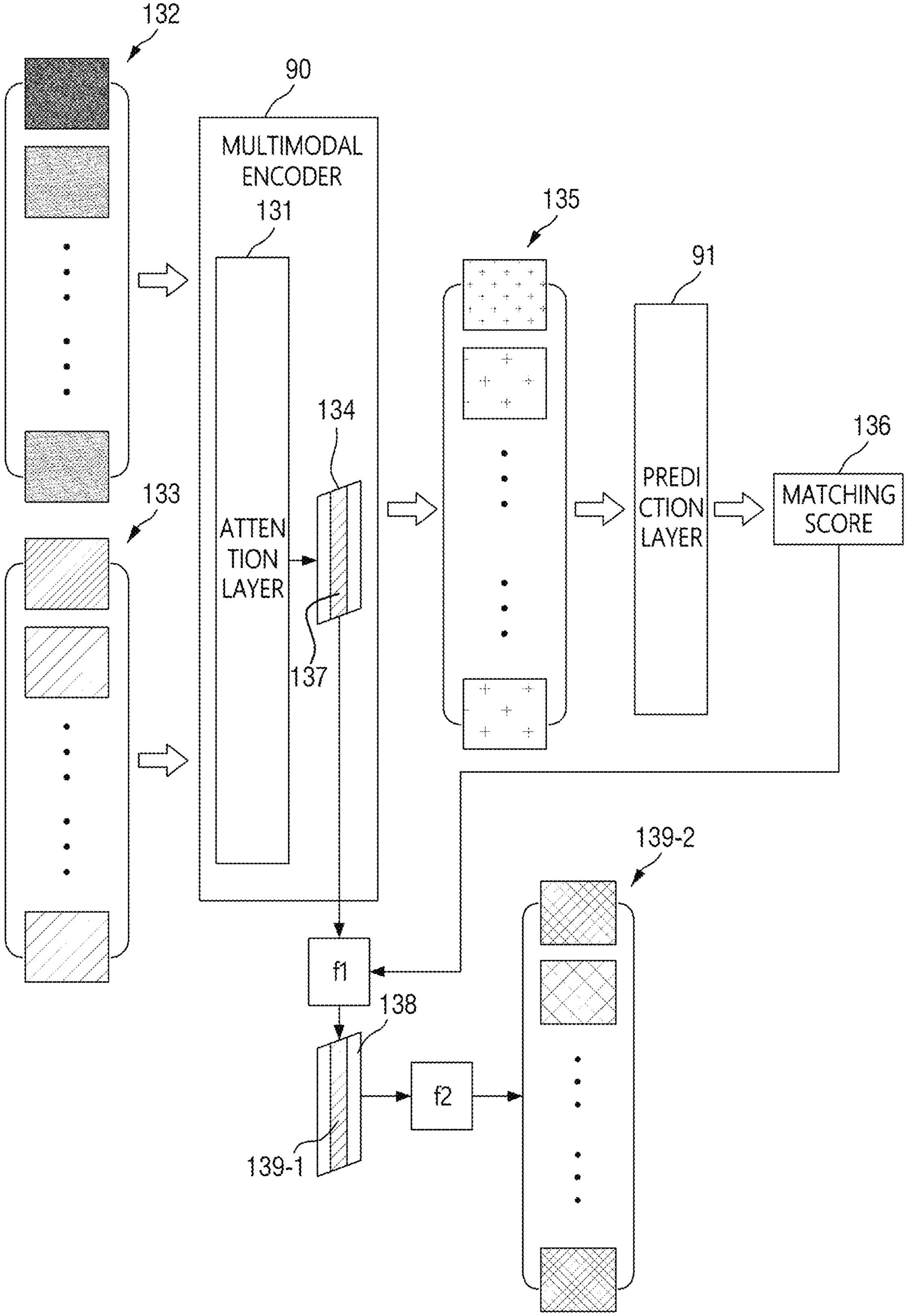
FIG. 13 is a schematic view illustrating a soft mask generation method according to some embodiments of the present disclosure.

Referring to FIG. 13, it is assumed that an attention map 134 is generated in an attention layer 131 of the multimodal encoder 90. As previously mentioned, the attention map 134 may be understood as being a map representing the relationships between token features 133 and patch features 132. When the number of tokens (excluding a CLS token) is L and the number of patches (excluding the CLS token) is N, an attention map 134 of a size of (L+1)×(N+1) (where "+1" indicates the addition of the CLS token) may be generated from an attention operation, but the present disclosure is not limited thereto.

The embedding system 10 may extract attention values for a region 137 of the attention map 134 that corresponds to the specific token. The embedding system 10 may normalize the attention map 134, for example, to values between 0 and 1, and extract attention values from the normalized attention map 134.

In some embodiments, the multimodal encoder 90 may be configured to include multiple attention layers. In this case, the embedding system 10 may aggregate multiple attention maps, generated in the multiple attention layers (e.g., through a method such as arithmetic mean, weighted average, etc.), and extract attention values from the attention map obtained by the aggregation. In this manner, a more sophisticated (or accurate) soft mask may be generated.

Moreover, in some embodiments, as illustrated in FIG. 13, the embedding system 10 may calculate a gradient that indicates the influence of the attention map 134 on a matching score 136 (e.g., a confidence score for a matching class) and may reflect the gradient into the attention map 134 (see f1, 138), thereby obtaining a gradient-reflected attention map 138. Then, the embedding system 10 may extract attention values from the gradient-reflected attention map 138 (see f2, 139-1). In this case, the relationships between the specific token and the patch features 132 may be accurately identified, and as a result, a more accurate soft mask 139-2 may be generated.

Specifically, the embedding system 10 may perform an ITM task for a positive sample pair consisting of an image sample and a text sample to produce the matching score 136. As mentioned earlier, the embedding system 10 may generate the matching score 136 by inputting the joint embeddings 135 into the prediction layer 91.

Thereafter, the embedding system 10 may calculate the gradient of the matching score 136 for each pixel (i.e., for each attention value) with respect to the attention map 134. The significance of the gradient for the influence of the attention map 134 on the matching score 136 is obvious to those skilled in the art to which the present disclosure pertains, and thus, a detailed description thereof will be omitted.

Thereafter, the embedding system 10 may reflect the gradient into the attention map 134. For example, the embedding system 10 may reflect the gradient into the attention map 134 through an operation such as element-wise multiplication. Specifically, the embedding system may reflect the gradient into the attention map 134, as indicated by Equation (1):

$$A^{(i)}_{GCAM} = \frac{1}{K}\sum_{k=1}^{K} ReLU\left(\frac{\partial q^{+(i)}_{ITM}}{\partial A^{(i)}_k} \odot A^{(i)}_k\right) \tag{1}$$

where i denotes an i-th sample pair within a batch, $A_{GCAM}$ denotes an attention map with the gradient reflected therein, K denotes the number of attention layers (or attention maps), ReLU denotes a Rectified Linear Unit (ReLU), which is a type of activation function, $$q^{+}_{ITM}$$

denotes the matching score for a positive pair, $A_k$ denotes a k-th attention map, and the symbol ⊙ denotes an element-wise multiplication operation.

Figure 14:
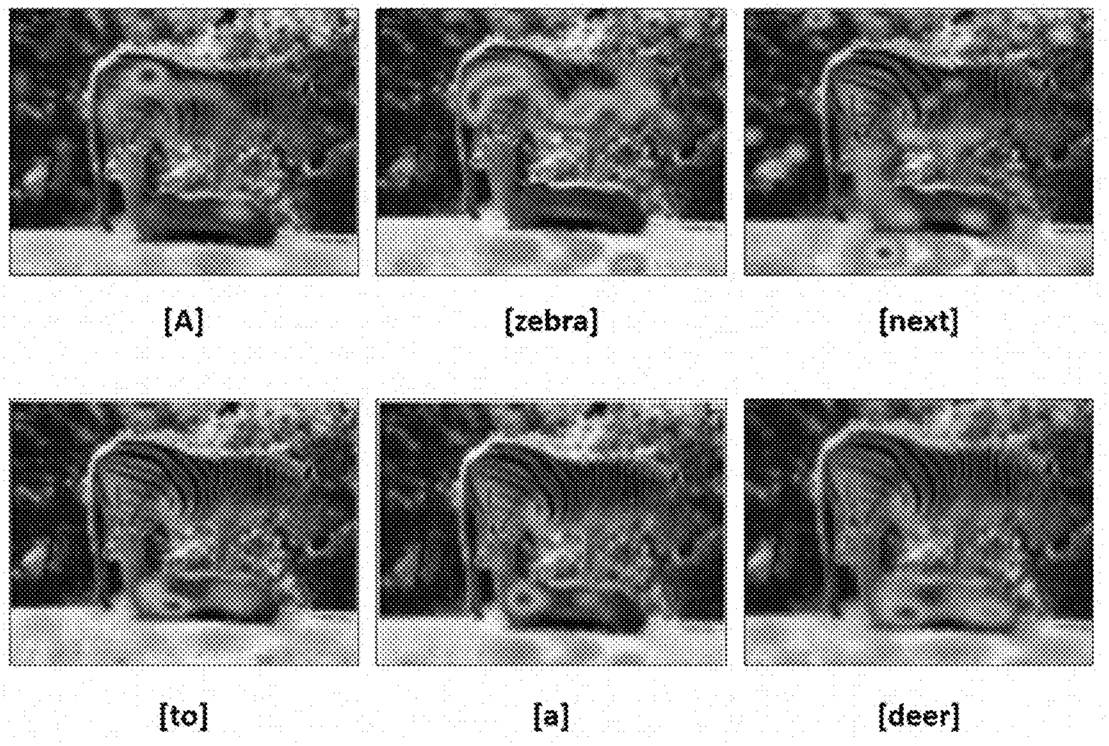
FIG. 14 is a schematic view illustrating the performance of the soft mask generation method according to some embodiments of the present disclosure.

FIG. 14 shows feature regions associated with different tokens of the text sample 81 of FIG. 8 based on the gradient-reflected attention map 138 of FIG. 13. As shown in FIG. 14, the feature regions associated with the corresponding tokens of the text sample 81 may be accurately identified through the gradient-reflected attention map 138. Moreover, by utilizing the gradient-reflected attention map 138, a soft mask capable of selectively weakening features of an image that are associated with a specific token may be created.

Referring back to FIG. 12, in S123, a soft mask may be generated based on the attention values extracted in S122 (e.g., by inverting the extracted attention values). For example, assuming that the extracted attention values have been normalized within an appropriate range of 0 to 1, the embedding system 10 may generate a soft mask for a specific token through an operation expressed by Equation (2).

$$\mathcal{M}^{(i)}_{soft} = \mathbb{1} - \hat{A}^{(i)}_{GCAM}[i_w] \tag{2}$$

where $M_{soft}$ denotes the soft mask, $i_w$ denotes the index of a selected token, and the symbol ∧ denotes a normalized state.

Thereafter, in S124, the soft mask may be applied to the patch features. For example, the embedding system 10 may apply the soft mask to the patch features through an operation such as element-wise multiplication. As a result, only the patch features associated with the specific token may be selectively weakened.

S36 has been described so far with reference to FIGS. 11 through 14. Steps subsequent to S37 will hereinafter be described with reference to FIG. 3.

Referring back to FIG. 3, in S38, the image encoder, the text encoder, and/or the multimodal encoder may be updated based on the first and second ITM losses. For example, the embedding system 10 may calculate a total loss based on the weighted sum of the first and second ITM losses and may update the weights of the image encoder, the text encoder, and/or the multimodal encoder based on the total loss. A method to update weighted parameters of a deep learning model through back-propagation is already well known in the art to which the present disclosure pertains, and thus, a detailed description thereof will be omitted.

Meanwhile, in some embodiments, the embedding system 10 may further calculate another type of loss, i.e., an image-text contrastive learning (ITC) loss, by performing an ITC task. The embedding system 10 may further update the weighted parameters of the encoders based on the ITC loss, which may also be reflected into the total loss. Consequently, semantic alignment between image embeddings (i.e., patch features) and text embeddings (i.e., token features) may be strengthened, and this will hereinafter be described later with reference to FIG. 15.

Moreover, in some embodiments, the embedding system 10 may calculate another type of loss, i.e., a masked-language modeling (MLM) loss, by performing an MLM task. Thereafter, the embedding system 10 may update the weighted parameters of the encoders based on the MLM loss, which may also be reflected into the total loss. Consequently, embeddings (e.g., text embeddings or joint embeddings) that are faithful to contextual information of input text may be generated, and this will hereinafter be described later with reference to FIG. 16.

Figure 17:
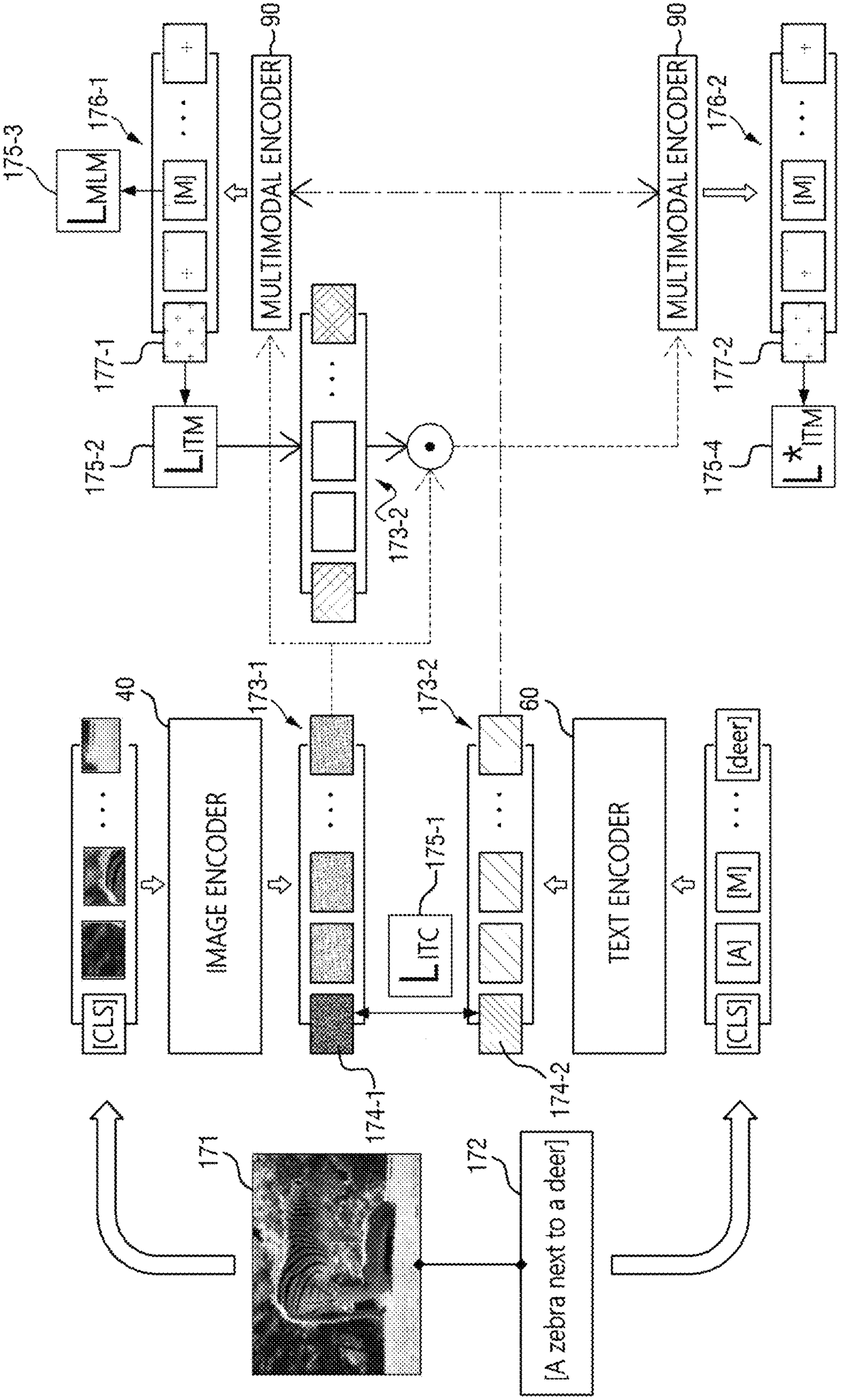
FIG. 17 is a schematic view illustrating multimodal embedding learning based on various tasks according to some embodiments of the present disclosure.

Furthermore, in some embodiments, embedding learning may be performed. For example, the embedding system 10 may update the weighted parameters of the encoders by concurrently performing the aforementioned tasks earlier, as illustrated in FIG. 17.

Referring back to FIG. 3, in S39, a determination may be made as to whether termination conditions for training are satisfied. The termination conditions may be established based on factors such as the number of iterations (e.g., epochs), training time, magnitude of losses, and training status of all sample pairs, but the present disclosure is not limited thereto. If the termination conditions are not satisfied, S32 through S38 may be performed again for different pairs of samples within the paired datasets. Through an iterative execution of S32 through S38 on multiple image-text sample pairs, each deep learning model may be equipped with multimodal embedding capabilities.

Meanwhile, although not explicitly illustrated in FIG. 3, in some embodiments, the embedding system 10 may perform various multimodal tasks, such as image-to-text retrieval and text-to-image retrieval based on the similarity between patch features of an image query and token features (e.g., captions) of stored text. For example, the embedding system 10 may perform image-to-text retrieval. Alternatively, the embedding system 10 may perform image-to-text retrieval using a method similar to an ITM task (e.g., by performing matching between the image query and the stored text based on joint embeddings). Similarly, the embedding system 10 may perform text-to-image retrieval.

The multimodal embedding method according to some embodiments of the present disclosure has been described so far with reference to FIGS. 3 through 14. As described above, each deep learning model (e.g., the image encoder 40, the text encoder 60, or the multimodal encoder 90) for multimodal embedding may be trained by softly masking features of an image sample that are associated with a specific token (or a word) and performing an ITM task. In this case, each deep learning model may be prevented from focusing solely on discriminative regions of an input image and may generate embeddings with various information (or contextual information) regarding the input image reflected therein. That is, each deep learning model may comprehensively understand the input image and may thereby generate embeddings. Furthermore, as the use of soft masking may increase the difficulty of an ITM task, the multimodal embedding performance of each deep learning model may be further enhanced. Additionally, as the performance (or accuracy) of multimodal embedding is improved, the performance of various multimodal tasks (e.g., image-to-text retrieval, text-to-image retrieval, visual question answering, image captioning, etc.) may also be significantly improved.

Moreover, a gradient indicating the influence of an attention map (generated in an attention layer of the multimodal encoder 90) on the matching score of a positive pair may be calculated. Attention values corresponding to the specific token may be extracted from an attention map with the calculated gradient reflected therein, and a soft mask may be generated based on the extracted attention values. In this case, a refined soft mask capable of selectively weakening only the features of the image sample that are associated with the specific token may be generated. Since this approach does not require fine-grained annotation information (e.g., object region information), self-supervised learning may be enabled, and the cost of preparing paired datasets may be considerably reduced.

An ITC task-based multimodal embedding learning method according to some embodiments of the present disclosure will hereinafter be described with reference to FIG. 15.

Figure 15:
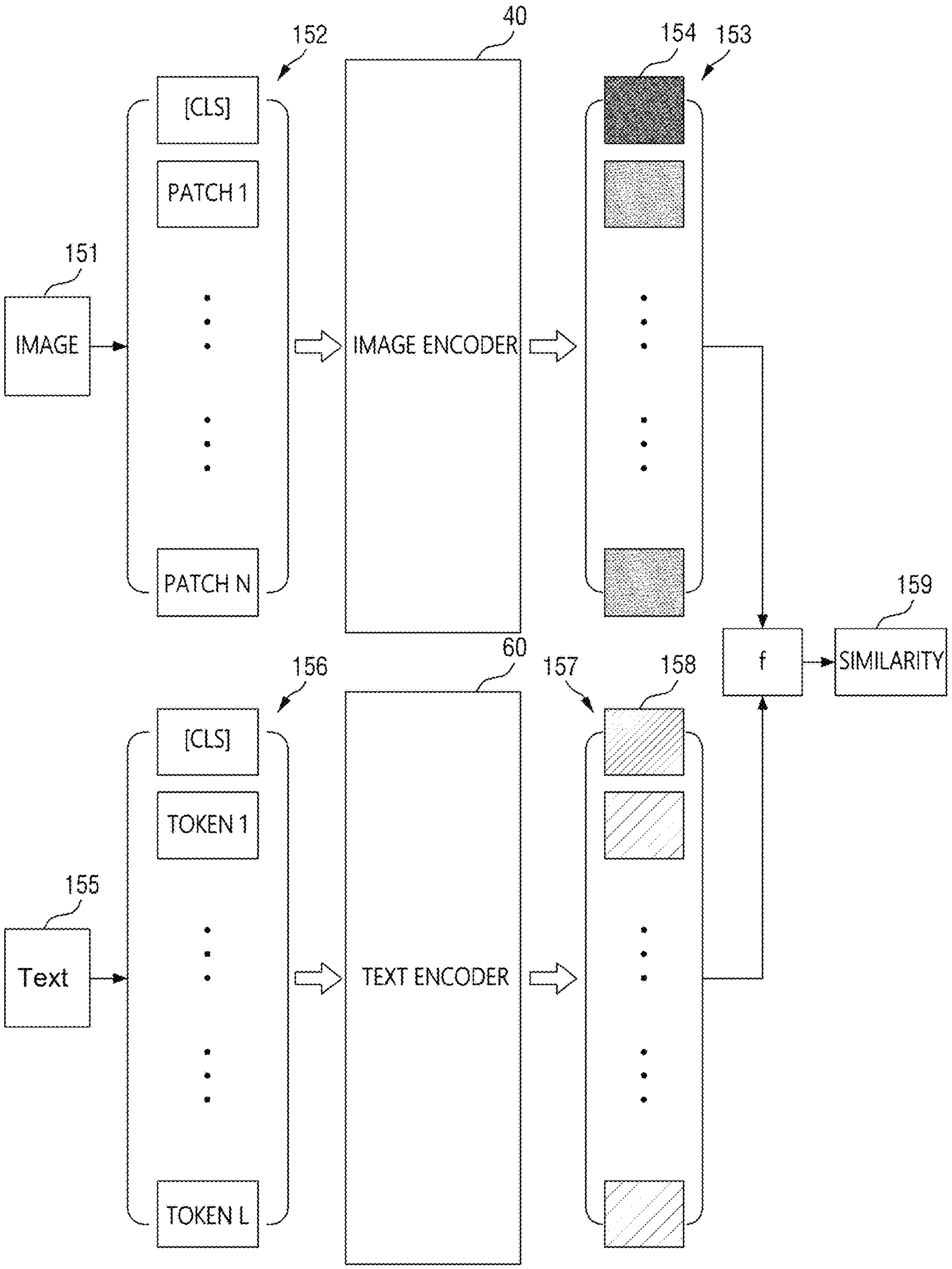
FIG. 15 is a schematic view illustrating an image-to-text contrastive learning task-based multimodal embedding learning method according to some embodiments of the present disclosure.

Referring to FIG. 15, the embedding system 10 may generate features 153 for patches 152 of an image sample 151 through the image encoder 40 and features 157 for tokens 156 of a text sample 155 through the text encoder 60. In this case, the image sample 151 and the text sample 155 may form a positive or negative pair.

Thereafter, the embedding system 10 may calculate a feature (or embedding) similarity 159 between at least some of the patch features 153 and at least some of the token features 157.

For example, the embedding system 10 may calculate a feature similarity 159 between patch and token features 154 and 158 that correspond to a CLS token, using a similarity operation (e.g., multiplication, cosine similarity, etc.).

In another example, the embedding system 10 may calculate a feature similarity 159 between multiple patch features 153 and multiple token features 157 using similarity operations.

In another example, the embedding system 10 may calculate a representative feature for the patch features 153 and a representative feature for the token features 157 and may calculate a feature similarity 159 between the calculated representative features using similarity operations.

In another example, the embedding system 10 may calculate a first feature similarity (i.e., an image-to-text feature similarity) by performing the similarity operations on the patch features 154 first and then on the token features 158 and may calculate a second feature similarity (i.e., a text-to-image feature similarity) by performing the similarity operations in the opposite order (in a case where similarity operations do not satisfy the commutative law). The embedding system 10 may then calculate the feature similarity 159 using the weighted sum of the first and second feature similarities.

In another example, the embedding system 10 may calculate the feature similarity 159 using various combinations of the aforementioned examples.

If target features that are subject to similarity operations, i.e., the patch features 154 and the token features 158, have different sizes or different numbers of dimensions or are not suitable for the similarity operations, the embedding system 10 may modify the sizes (or the numbers of dimensions) of the target features (e.g., change the sizes of the target features to be the same) using a projection layer (e.g., a linear projection layer) before performing the similarity operations. In this case, the weight parameters of the projection layer may also be updated based on an ITC loss.

Thereafter, the embedding system 10 may calculate an ITC loss based on the feature similarity 159. For example, for a positive pair, the embedding system 10 may produce a smaller ITC loss for a greater feature similarity. On the contrary, for a negative pair, the embedding system 10 may produce a smaller ITC loss for a smaller feature similarity 159.

In some embodiments, the embedding system 10 may calculate ITC loss (e.g., a type of focal loss), by reflecting a focal weight in the feature similarity 159. The focal weight may be determined to be smaller for a greater feature similarity 159 and larger for a smaller feature similarity 159. In this manner, a smaller weight may be assigned to easier sample pairs and a greater weight may be assigned to more challenging sample pairs. For example, the embedding system 10 may calculate an ITC loss, as indicated by Equation (3):

$$\mathcal{L}_{ITC}^{*} = -\frac{1}{2B}\sum_{i=1}^{B}\left[\left(1-p_{v2t}^{(i)}\right)^{\gamma}\log p_{v2t}^{(i)} + \left(1-p_{t2v}^{(i)}\right)^{\gamma}\log p_{t2v}^{(i)}\right] \quad (3)$$

where $$L_{ITC}^{*}$$

denotes the ITC loss with the focal weight reflected therein, B denotes the batch size, $P_{v2t}$ and $P_{t2v}$ denote image-to-text and text-to-image feature similarities, respectively, $(1\text{-}P_{v2t})$ and $(1\text{-}P_{t2v})$ denote the focal weights for the image-to-text and text-to-image feature similarities $P_{v2t}$ and $P_{t2v}$, respectively, and y denotes a factor for adjusting the focal weights.

Thereafter, the embedding system 10 may update the image encoder 40 and the text encoder 60 based on the ITC loss. Consequently, semantic alignment between the patch features 153 (or image embeddings), which are generated through the image encoder 40, and the token features 157 (or text embeddings), which are generated through the text encoder 60, may be enhanced. As a result, the embedding performance for multimodal data may be further improved.

The ITC task-based multimodal embedding learning method according to some embodiments of the present disclosure has been described so far with reference to FIG. 15. An MLM task-based multimodal embedding learning method according to some embodiments of the present disclosure will hereinafter be described with reference to FIG. 16.

Figure 16:
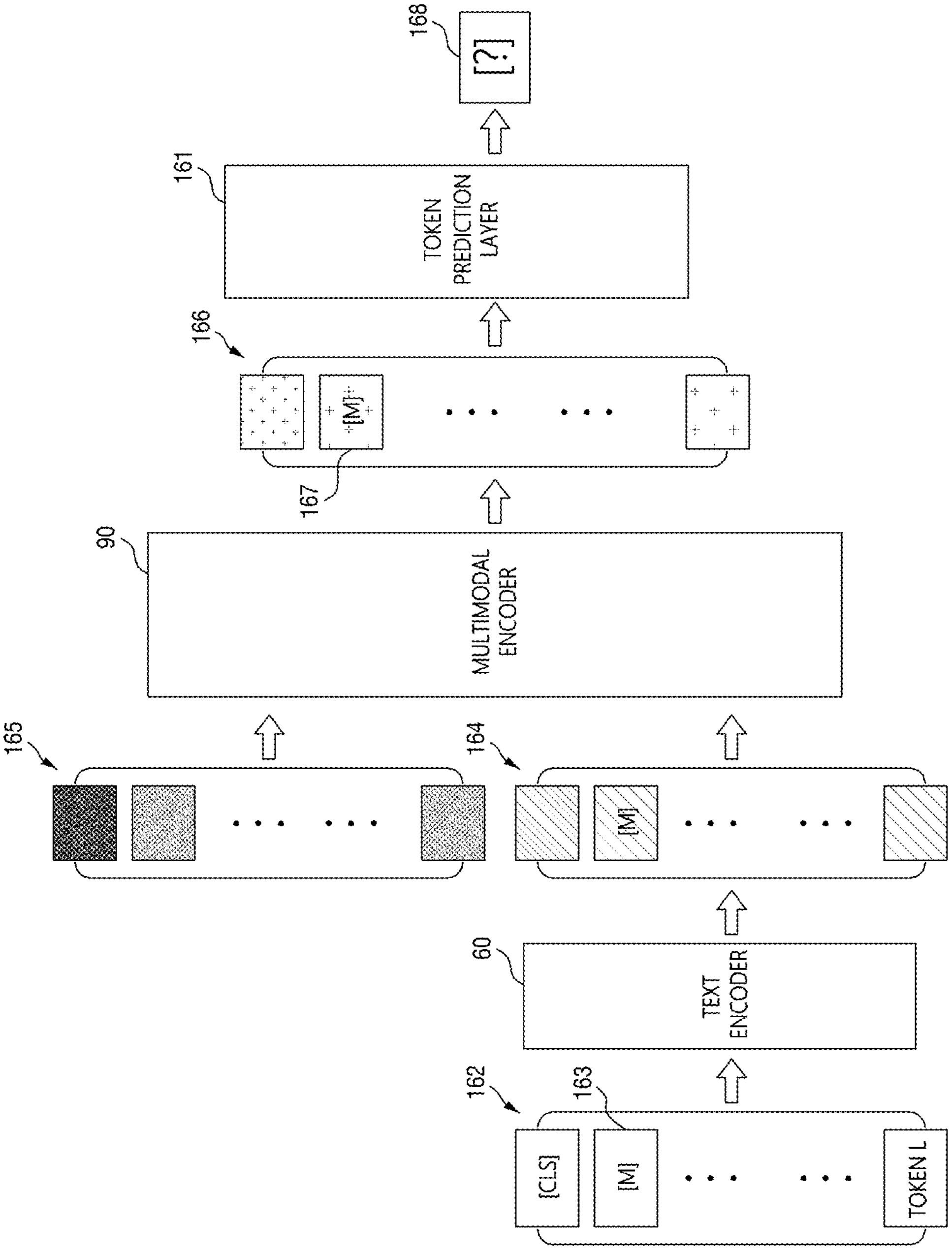
FIG. 16 is a schematic view illustrating a masked-language modeling (MLM) task-based multimodal embedding learning method according to some embodiments of the present disclosure.

Referring to FIG. 16, the embedding system 10 may generate token features 164 by substituting at least one of a plurality of tokens 162 of a text sample with a mask token 163 and performing encoding through the text encoder 60.

Thereafter, the embedding system 10 may generate joint embeddings 166 by inputting patch features 165 and the token features 164 into the multimodal encoder 90. As mentioned earlier, the joint embeddings 166 may include embeddings for the corresponding tokens 162 of the text sample.

Thereafter, the embedding system 10 may predict a value 168 of the mask token 163 (i.e., the original token 162 yet to be substituted) by inputting (or feeding) the embedding 167 corresponding to the mask token 163 into a token prediction layer 161. The token prediction layer 161 may be configured to output confidence scores for predefined tokens (i.e., token-specific confidence scores) and may be implemented as, for example, a fully connected layer, but the present disclosure is not limited thereto.

Thereafter, the embedding system 10 may calculate an MLM loss indicating the difference between the result of token prediction result and the ground truth, using a classification loss function such as cross-entropy loss and may update the weight parameters of the image encoder 40, text encoder 60, and multimodal encoder 90 based on the MLM loss.

The MLM task-based multimodal embedding learning method according to some embodiments of the present disclosure has been described so far with reference to FIG. 16. As described above, by performing an MLM task, embeddings (e.g., text embeddings, joint embeddings, etc.) that are faithful to contextual information of input text may be generated with ease.

Multimodal embedding learning based on the aforementioned tasks will hereinafter be described with reference to FIG. 17. Referring to FIG. 17, it is assumed that an image sample 171 and a text sample 172 form a positive pair, an ITC loss 175-1 ("$L_{ITC}$") is calculated based on the similarity between features 174-1 and 174-2 corresponding to a CLS token, and a first ITM loss 175-2 ("$L_{ITM}$") and a second ITM loss 175-4 ("$L^*_{ITM}$") are calculated based on embeddings 177-1 and 177-2 corresponding to the CLS token.

As illustrated in FIG. 17, the embedding system 10 may generate patch features 173-1 for the image sample 171 through the image encoder 40 and token features 173-2 for the text sample 172 through the text encoder 60. Also, the embedding system 10 may generate joint embeddings 176-1 by inputting the patch features 173-1 and the token features 173-2 into the multimodal encoder 90, and may calculate the first ITM loss 175-2 by performing an ITM task based on the joint embeddings 176-1.

Also, the embedding system 10 may calculate an MLM loss 175-3 ("$L_{MLM}$") by performing an MLM task based on a joint embedding 176-1 corresponding to a mask token.

Thereafter, the embedding system 10 may generate a soft mask 173-2 for a specific token using the aforementioned method and may apply the soft mask 173-2 to the patch features 173-1. As a result, only patch features 173-1 that are associated with the specific token may selectively weakened.

Thereafter, the embedding system 10 may generate joint embeddings 176-2 by inputting the masked patch features 173-1 and the token features 173-2 into the multimodal encoder 90. Thereafter, the embedding system 10 may calculate the second ITM loss 175-4 by performing an ITM task again. The second ITM loss 175-4 may effectively prevent each deep learning model (e.g., the image encoder 40 or the multimodal encoder 90) from focusing solely on discriminative regions of an input image and instead may guide each deep learning model to comprehensively understand various features (information) of the input image and generate embeddings.

While not explicitly illustrated in FIG. 17, the embedding system 10 may also perform an MLM task again based on the joint embedding 176-2 corresponding to the mask token 163.

In some embodiments, the embedding system 10 may substitute a specific token of the text sample 172 with a mask token and may then perform ITM and MLM tasks using the soft mask 173-2 for the same token. Alternatively, the embedding system 10 may perform an ITC task using the patch features 173-1 and token features 173-2 with the soft mask 173-2 applied thereto for the same token. In these cases, semantic alignment between image embeddings (i.e., patch features) and text embeddings (i.e., token features) may be further improved.

Multimodal embedding learning based on various tasks has been described so far with reference to FIG. 17. An exemplary computing device 180 capable of implementing the embedding system 10 will hereinafter be described with reference to FIG. 18.

Figure 18:
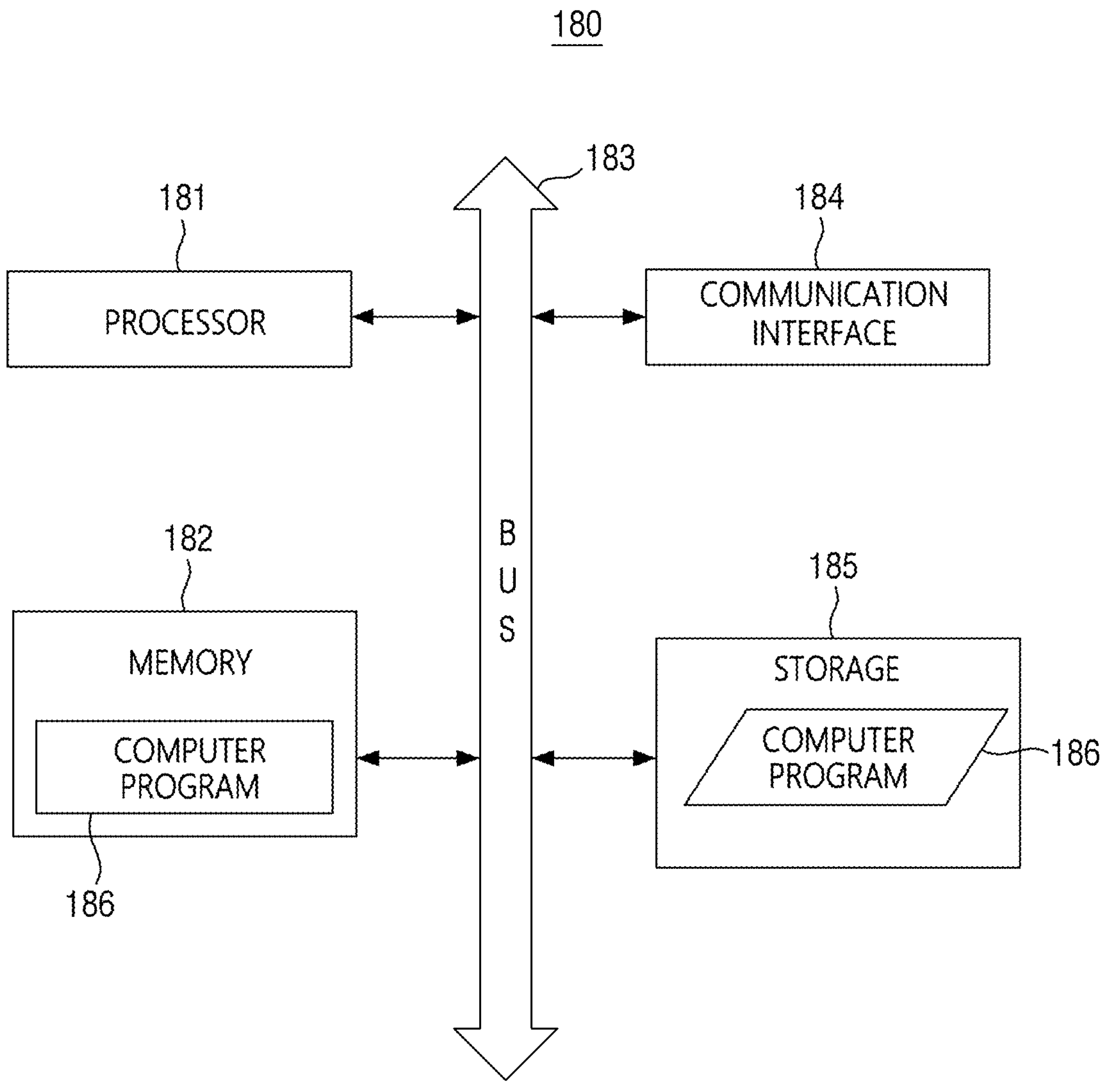
FIG. 18 is a block diagram of an exemplary computing device that may implement the multimodal embedding system according to some embodiments of the present disclosure.

FIG. 18 is a hardware configuration view of an exemplary computing device 180.

Referring to FIG. 18, the computing device 180 may include at least one processor 181, a bus 183, a communication interface 184, a memory 182, which loads a computer program 186 executed by the processor 181, and a storage 185, which stores the computer program 186. FIG. 18 only illustrates components relevant to the embodiments of the present disclosure, and it is obvious that the computing device 180 may further include other general components other than those illustrated in FIG. 18. In other words, the computing device 180 may be configured to include various components other than those illustrated in FIG. 18 or may be configured without some of the components illustrated in FIG. 18. The components of the computing device 180 will hereinafter be described.

The processor 181 may control the overall operations of the components of the computing device 180. The processor 181 may be configured to include at least one of a central processing unit (CPU), a micro-processor unit (MPU), a micro controller unit (MCU), a graphic processing unit (GPU), and any other known form of processor in the field to which the present disclosure pertains. The processor 181 may perform computations for at least one application or program for executing operations/methods according to some embodiments of the present disclosure. The computing device 180 may be equipped with one or more processors.

The memory 182 may store various data, commands, and/or information. The memory 182 may load the computer program 186 from the storage 185 to execute the operations/methods according to some embodiments of the present disclosure. The memory 182 may be implemented as a volatile memory such as a random-access memory (RAM), but the present disclosure is not limited thereto.

The bus 183 may provide communication functionality among the components of the computing device 180. The bus 183 may be implemented in various forms, including an address bus, a data bus, and a control bus.

The communication interface 184 may support both wired and wireless Internet communication for the computing device 180. Additionally, the communication interface 184 may also support various other communication methods. For this purpose, the communication interface 184 may be configured to include a communication module that is well known in the field to which the present disclosure pertains.

The storage 185 may temporarily store at least one computer program 186. The storage 185 may be configured to include a non-volatile memory (such as a read-only memory (ROM), an erasable programmable ROM (EPROM), an electrically erasable programmable ROM (EEPROM), or a flash memory), a hard disk, a removable disk, or any other well-known computer-readable medium in the field to which the present disclosure.

The computer program 186 may include one or more instructions that, upon being loaded into the memory 182, direct the processor 181 to perform the operations/methods according to some embodiments of the present disclosure. In other words, by executing the loaded instructions, the processor 181 may perform the operations/methods according to some embodiments of the present disclosure.

For example, the computer program 186 may include instructions to perform the following operations: generating a plurality of patch features for an image sample through an image encoder; generating a plurality of token features for a text sample through a text encoder; softly masking patch features associated with a specific token of the text sample; generating joint embeddings by inputting the masked patch features and the token features into a multimodal encoder; and updating the multimodal encoder by performing an ITM task based on the joint embeddings, wherein the image sample and text sample form a positive pair. In this example, the embedding system 10 may be implemented by the computing device 180.

In some embodiments, the computing device 180 may refer to a virtual machine implemented based on cloud technology. For example, the computing device 180 may be a virtual machine operating on one or more physical servers within a server farm. In this example, at least some of the components of the computing device 180, i.e., the processor 181, the memory 182, and the storage 185, may be implemented as virtual hardware, and the communication interface 184 may be implemented as a virtual networking element such as a virtual switch.

An exemplary computing device 180 that may implement the embedding system 10 has been described so far with reference to FIG. 18.

Various embodiments of the present disclosure and their effects have been described with reference to FIGS. 1 through 18.

According to the aforementioned and other embodiments of the present disclosure, each deep learning model for multi-modal embedding (e.g., an image encoder, a text encoder, or a multimodal encoder) may be trained by softly masking features of an image sample that are associated with a specific token (or word) and performing an image-text matching (ITM) task. In this case, each deep learning model may be effectively prevented from focusing solely on discriminative regions of an input image, enabling the creation of embeddings that encompass various information (or contextual information) on the input image. That is, each deep learning model may comprehensively understand the input image and may thereby generate embeddings. Furthermore, as the use of soft masking may increase the difficulty of an ITM task may, the multimodal embedding performance of each deep learning model may be further enhanced. Additionally, as the multimodal embedding performance (or accuracy) of each deep learning model is improved, the performance of various multimodal tasks (e.g., image-to-text retrieval, text-to-image retrieval, visual question answering, image captioning, etc.) may also be significantly improved.

Also, a gradient indicating the influence of an attention map (generated in the attention layer of the multimodal encoder) on the matching score of a positive pair may be calculated. Then, attention values corresponding to the specific token are extracted from the attention map with the gradient reflected therein, and a soft mask may be generated based on the extracted (or inverted) attention values. In this case, a sophisticated soft mask capable of selectively weakening the features of the image sample that are associated with the specific token may be generated. Since this approach does not require fine-grained annotation information (e.g., object region information), self-supervised learning may be enabled, and the cost of preparing paired datasets may be considerably reduced.

Also, by performing an image-text contrastive learning (ITC) task, semantic alignment between image embeddings (i.e., patch features) and text embeddings (i.e., token features) may be enhanced, leading to further improvement in the multimodal embedding performance of each deep learning model.

Also, by calculating a contrastive learning loss based on a focal weight, each deep learning model (e.g., the text encoder or the image encoder) may focus more on challenging sample pairs during training. Consequently, the multimodal embedding performance of each deep learning model may be further enhanced.

Also, by performing a masked-language modeling (MLM) task, embeddings (e.g., text embeddings, joint embeddings, etc.) faithful to contextual information of input text may be easily generated.

However, the technical concepts of the present disclosure are not limited to the effects set forth herein, and other effects not explicitly mentioned may be readily understood by those skilled in the art to which the present disclosure, from the provided description below.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results may be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications may be made to the example embodiments without substantially departing from the principles of the present disclosure. Therefore, the disclosed example embodiments of the disclosure are used in a generic and descriptive sense only and not for purposes of limitation.

What is claimed is:

1. A method for multimodal embedding, performed by at least one computing device, the method comprising:
   - generating a plurality of patch features for an image sample through an image encoder, wherein the image sample and a text sample form a positive pair;
   - generating a plurality of token features for the text sample through a text encoder;
   - generating a first joint embedding by inputting the plurality of patch features and the plurality of token features into a multimodal encoder;
   - performing a first image-text matching (ITM) task based on the first joint embedding;
   - applying a soft mask to the plurality of patch features, the soft mask being associated with a specific token of the text sample;
   - generating a second joint embedding by inputting the masked plurality of patch features and the plurality of token features into the multimodal encoder; and
   - updating the multimodal encoder by performing a second ITM task to predict a matching status between the image sample and the text sample using the second joint embedding.

2. The method of claim 1, wherein the specific token is randomly selected from among tokens of the text sample.

3. The method of claim 1, wherein
   - the multimodal encoder includes at least one attention layer, which analyzes relationships between the plurality of token features and the plurality of patch features, and
   - the applying the soft mask comprises:
   - extracting attention values for a feature of the specific token and the plurality of patch features from at least one attention map generated by the at least one attention layer;
   - generating the soft mask for masking the plurality of patch features based on the attention values; and
   - applying the soft mask to the plurality of patch features.

4. The method of claim 3, wherein
   - the extracting the attention values comprises:
   - calculating a matching score between the text sample and the image sample by performing the first ITM task based on the first joint embedding;
   - reflecting a gradient, which indicates an influence of the at least one attention map on the matching score, in the at least one attention map; and
   - extracting the attention values from the at least one attention map with the gradient reflected therein.

5. The method of claim 3, wherein the extracting the attention values comprises:
   - aggregating a plurality of attention maps, generated in a plurality of attention layers; and
   - extracting the attention values from the aggregated plurality of attention maps.

6. The method of claim 1, wherein the image encoder and the text encoder are updated through the second ITM task.

7. The method of claim 1, wherein further comprising:
   - updating the image encoder and the text encoder by performing a contrastive learning task based on at least one of the plurality of patch features and at least one of the plurality of token features.

8. The method of claim 7, wherein
   - the plurality of patch features include a special patch feature corresponding to a special token,
   - the plurality of token features include a special token feature corresponding to the special token, and
   - a loss of the contrastive learning task is calculated based on a similarity between the special patch feature and the special token feature.

9. The method of claim 8, wherein
   - the loss of the contrastive learning task is calculated based on a feature similarity and a focal weight, and
   - the greater the feature similarity, the smaller the focal weight is determined to be.

10. The method of claim 1, wherein
   - the plurality of token features include a feature corresponding to a mask token,
   - the second joint embedding includes a plurality of embeddings corresponding to tokens of the text sample, and
   - the method further comprises additionally updating the multimodal encoder by performing a masked-language modeling (MLM) task based on an embedding corresponding to the mask token, among the plurality of embeddings.

11. The method of claim 1, wherein the plurality of token features include a feature corresponding to a mask token and are obtained by substituting the specific token with the mask token.

12. The method of claim 1, wherein the updating the multimodal encoder comprises:

predicting the matching status between the image sample and the text sample by inputting at least one embedding of the second joint embedding into a prediction layer; and updating the multimodal encoder based on a loss from a result of the predicting.

13. The method of claim 12, wherein the second joint embedding includes a plurality of embeddings, and among the plurality of embeddings, an embedding corresponding to a special token is input into the prediction layer.

14. A system for multimodal embedding comprising:

at least one processor; and a memory configured to store at least one instruction, wherein the at least one processor, by executing the at least one instruction, performs operations comprising:

generating a plurality of patch features for an image sample through an image encoder, wherein the image sample and a text sample form a positive pair;

generating a plurality of token features for the text sample through a text encoder;

generating a first joint embedding by inputting the plurality of patch features and the plurality of token features into a multimodal encoder;

performing a first image-text matching (ITM) task based on the first joint embedding;

applying a soft mask to the plurality of patch features, the soft mask being associated with a specific token of the text sample;

generating a second joint embedding by inputting the masked plurality of patch features and the plurality of token features into the multimodal encoder; and updating the multimodal encoder by performing a second ITM task to predict a matching status between the image sample and the text sample using the second joint embedding.

15. A non-transitory computer-readable recording medium storing computer program executable by a computing device, to perform:

generating a plurality of patch features for an image sample through an image encoder, wherein the image sample and a text sample form a positive pair;

generating a plurality of token features for the text sample through a text encoder;

generating a first joint embedding by inputting the plurality of patch features and the plurality of token features into a multimodal encoder;

performing a first image-text matching (ITM) task based on the first joint embedding;

applying a soft mask to the plurality of patch features, the soft mask being associated with a specific token of the text sample;

generating a second joint embedding by inputting the masked plurality of patch features and the plurality of token features into the multimodal encoder; and updating the multimodal encoder by performing a second ITM task to predict a matching status between the image sample and the text sample using the second joint embedding.

* * * * *